(12) United States Patent
Ta et al.

(10) Patent No.: US 10,366,629 B2
(45) Date of Patent: Jul. 30, 2019

(54) PROBLEM SOLVER STEPS USER INTERFACE

(71) Applicant: Microsoft Technology Licensing, LLC, Redmond, WA (US)

(72) Inventors: Lasifu Ta, Redmond, WA (US); Lisa Carolyn Cherian, Woodinville, WA (US); Mina Spasić, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 227 days.

(21) Appl. No.: 15/338,287

(22) Filed: Oct. 28, 2016

(65) Prior Publication Data
US 2018/0121031 A1 May 3, 2018

(51) Int. Cl.
*G06F 17/00* (2019.01)
*G09B 19/02* (2006.01)
*G09B 19/00* (2006.01)
*G09B 5/12* (2006.01)
*G09B 7/00* (2006.01)

(52) U.S. Cl.
CPC ........... *G09B 19/025* (2013.01); *G09B 5/125* (2013.01); *G09B 7/00* (2013.01); *G09B 19/0092* (2013.01)

(58) Field of Classification Search
CPC ... G06F 3/0482; G06F 3/0485; G09B 19/025; G09B 19/0092; G09B 5/125; G09B 7/00
USPC ................................. 715/273, 784, 786–787
See application file for complete search history.

(56) References Cited

U.S. PATENT DOCUMENTS

| | | | |
|---|---|---|---|
| 7,899,694 B1 * | 3/2011 | Marshall | G06Q 10/063 705/7.32 |
| 10,091,144 B1 * | 10/2018 | Nodine | G06F 16/24 |
| 2002/0197594 A1 | 12/2002 | Dickmeyer et al. | |
| 2003/0041078 A1 | 2/2003 | Child et al. | |
| 2003/0088596 A1 | 5/2003 | Child et al. | |
| 2004/0100510 A1 * | 5/2004 | Milic-Frayling | G06F 17/30905 715/864 |

(Continued)

OTHER PUBLICATIONS

Akatugba et al., Sociocultural Influences on Physics Students' Use of Proportional Reasoning in a Non-Western Country, Wiley Library 1999, pp. 305-320. (Year: 1999).*

(Continued)

*Primary Examiner* — Cong-Lac Huynh
(74) *Attorney, Agent, or Firm* — Merchant & Gould

(57) ABSTRACT

Displaying steps of a solution to a problem is provided. A tutorial application determines the solution and generates a card-based UI that presents solution steps on numbered cards sized to accommodate the step. One step is displayed as the focused step at a time. Steps are displayed in a step-by-step or an all-steps mode. In the step-by-step mode, navigation to a next or previous step is enabled via a selection of a next step control and a previous step control, respectively. The next/previous step controls are displayed in static positions, allowing the user to tap through steps by tapping in a single spot. In the all-steps mode, a portion of the next step is visible to indicate that there is another step below the focused step. Scrolling is enabled for allowing the user to navigate to a desired step. A mode selector is provided for enabling switching between viewing modes.

20 Claims, 22 Drawing Sheets

(56) References Cited

U.S. PATENT DOCUMENTS

| | | | |
|---|---|---|---|
| 2004/0205631 A1* | 10/2004 | Keohane | G06F 17/30899 715/273 |
| 2005/0114791 A1* | 5/2005 | Bollenbacher | G06F 3/0485 715/787 |
| 2008/0276221 A1* | 11/2008 | Lev | G06F 8/74 717/120 |
| 2009/0018979 A1 | 1/2009 | Yu et al. | |
| 2009/0113446 A1* | 4/2009 | Hamilton | G06Q 10/107 719/314 |
| 2009/0148824 A1* | 6/2009 | Argott | G09B 5/08 434/307 R |
| 2009/0197685 A1* | 8/2009 | Shuster | A63F 13/12 463/42 |
| 2009/0231355 A1* | 9/2009 | Perronnin | G09G 5/06 345/594 |
| 2010/0251118 A1* | 9/2010 | Peterson | G06F 9/453 715/710 |
| 2011/0129808 A1* | 6/2011 | Srivastava | G09B 7/02 434/322 |
| 2011/0225494 A1* | 9/2011 | Shmuylovich | G06F 3/04883 715/705 |
| 2012/0131441 A1* | 5/2012 | Jitkoff | G06F 17/30905 715/234 |
| 2012/0141960 A1 | 6/2012 | Khalsa et al. | |
| 2012/0284703 A1* | 11/2012 | Hoff | G06F 8/61 717/174 |
| 2013/0247006 A1* | 9/2013 | Trowbridge | G06F 9/44 717/126 |
| 2014/0059438 A1* | 2/2014 | Wu | G06F 3/0487 715/730 |
| 2014/0074629 A1* | 3/2014 | Rathod | G06Q 10/10 705/14.73 |
| 2014/0093847 A1 | 4/2014 | Miasnikov et al. | |
| 2014/0279718 A1* | 9/2014 | Southey | G06N 5/04 706/11 |
| 2014/0295822 A1* | 10/2014 | Koo | G06Q 20/3278 455/420 |
| 2015/0012576 A1 | 1/2015 | Hatch | |
| 2015/0121201 A1* | 4/2015 | Sheldon | G06K 9/00469 715/249 |
| 2016/0217371 A1* | 7/2016 | Leithiser | G06F 16/00 |

OTHER PUBLICATIONS

"Integrate Sin[x]2 Cos[x] from 0 to pi/2", Retrieved on: Aug. 25, 2016 Available at: http://www.wolframalpha.com/input/?i=integrate+Sin%5Bx%5D%5E2+Cos%5Bx%5D+from+0+to+pi%2F2.

"Thinking Blocks Home", Retrieved on: Aug. 25, 2016 Available at: http://www.thinkingblocks.com/thinkingblocks_as/tb_as_main.html.

"How do I get Maple to show me the steps of a solution, not just the answer?", Retrieved on: Aug. 25, 2016 Available at: http://www.maplesoft.com/support/faqs/detail.aspx?sid=32712.

"Basic Math Decoded", Retrieved on: Aug. 25, 2016 Available at: http://www.nibcode.com/en/basic-math.

"Scientific Online Calculator", Retrieved on: Aug. 25, 2016 Available at: http://www.careerbless.com/calculators/ScientificCalculator/.

"MalMath: Step by step solver 1.8 APK", Published on: May 26, 2016 Available at: http://apk-dl.com/malmath-step-by-step-solver.

"Math", Retrieved on: Aug. 30, 2016 Available at: http://share.framerjs.com/o1dc8ii00pm/.

"Solve Math Equation Wasily Using Mobile Camera With PhotoMath App", Published on: Nov. 2014 Available at: http://www.howtocomp.com/2014/11/Solve-Math-Equation-Mobile-Camera-PhotoMath-App.html.

* cited by examiner

MOBILE COMPUTING DEVICE

PROBLEM SOLVER STEPS USER INTERFACE

BACKGROUND

Computing device users have increasingly come to expect that interaction with their devices and with the content displayed on the devices will be natural and intuitive. In particular, when using an application that tutors or educates the user about how to solve a particular problem in multiple steps, some users can become overwhelmed when all the steps are presented at once, particularly when there is not a clear indication or visual differentiation between a current steps and previous or next steps. Accordingly, an individual who is using the application to learn how to solve a problem or an individual using the application to teach another person how to solve a problem may want to limit the amount of information that is seen at one time. However, when a user wants to navigate to a particular step in a solution, it can be tedious to step through each of the steps in the solution to arrive at the desired step. Further, a user may want to switch between wanting to see all the steps in a solution to seeing one step at a time, and vice versa.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer storage media for displaying steps of a solution to a problem for improved user interaction. A tutorial application is provided for determining a solution to a problem and for generating a user interface that presents steps of the solution to a user in an efficient arrangement. The tutorial application may be one of various types of problem-solving applications, for example, a mathematical problem-solving application, a chemistry problem-solving application, a physics problem-solving application, a cooking/recipe application, or other type of application that is operative to present a plurality of informational steps to a user.

According to one aspect, steps of the solution are presented to the user in an efficient arrangement by displaying only one step as the selected or focused step at a time, which helps to not overwhelm the user with a presentation of too much information at a time.

According to another aspect, steps of the solution are presented to the user in an efficient arrangement by providing different viewing modes: a step-by-step mode and an all-steps mode. When in the step-by-step mode, the focused step is highlighted and displayed in a predetermined and generally-static position on the display. Further, in the step-by-step mode, navigation to a next step is enabled via a user interaction corresponding to a next step selection. In some examples, the next step selection is an interaction with a next step control. In other examples, the next step selection includes an interaction made via one of a plurality of modalities, such as a gesture, a voice command, etc.

According to an example, the next step control is displayed in a static position, which allows the user to efficiently tap through each step of the solution by tapping or selecting in a single spot without having to move his/her input device or finger. Responsive to navigation to the next step, the next step becomes the focused step, and is highlighted and displayed in the predetermined position. For example, the focused step is moved into a particular position, rather than focus being moved down the list of steps. In some examples, navigation to a previous step is enabled via a selection of a previous step control. In other examples, navigation to a previous step includes a user interaction corresponding to a previous step selection via one of various modalities. Responsive to the previous step selection, the solution is navigated to the previous step, wherein the previous step becomes the focused step and is highlighted and moved into the predetermined focus position.

When in the all-steps mode, the focused step is highlighted and scrolled slightly up such that at least a portion of the next step is visible to indicate to the user that there are more steps below/after the focused step. Further, in the all-steps mode, scrolling is enabled for allowing the user to scroll to a desired step in the solution. As the user scrolls, the focused step is automatically updated to the step located at the predetermined position on the page. Navigation to a previous or a next step is also enabled via a selection of the previous step selection and the next step selection respectively. According to an aspect, a mode selector is provided for enabling easy and efficient switching between viewing modes.

In some examples, the tutorial application generates and displays a card-based user interface, wherein each step is displayed on an individual card, and the cards are sized to accommodate the problem solving step. In other examples, separate problem steps are displayed in separate regions of the user interface that are not necessarily defined as separate cards. Further, a step number and a total number of steps (e.g., 1/10, step 1 of 10) are displayed in or proximate to each card or region to provide an indication to the user of where he/she is in the solution.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
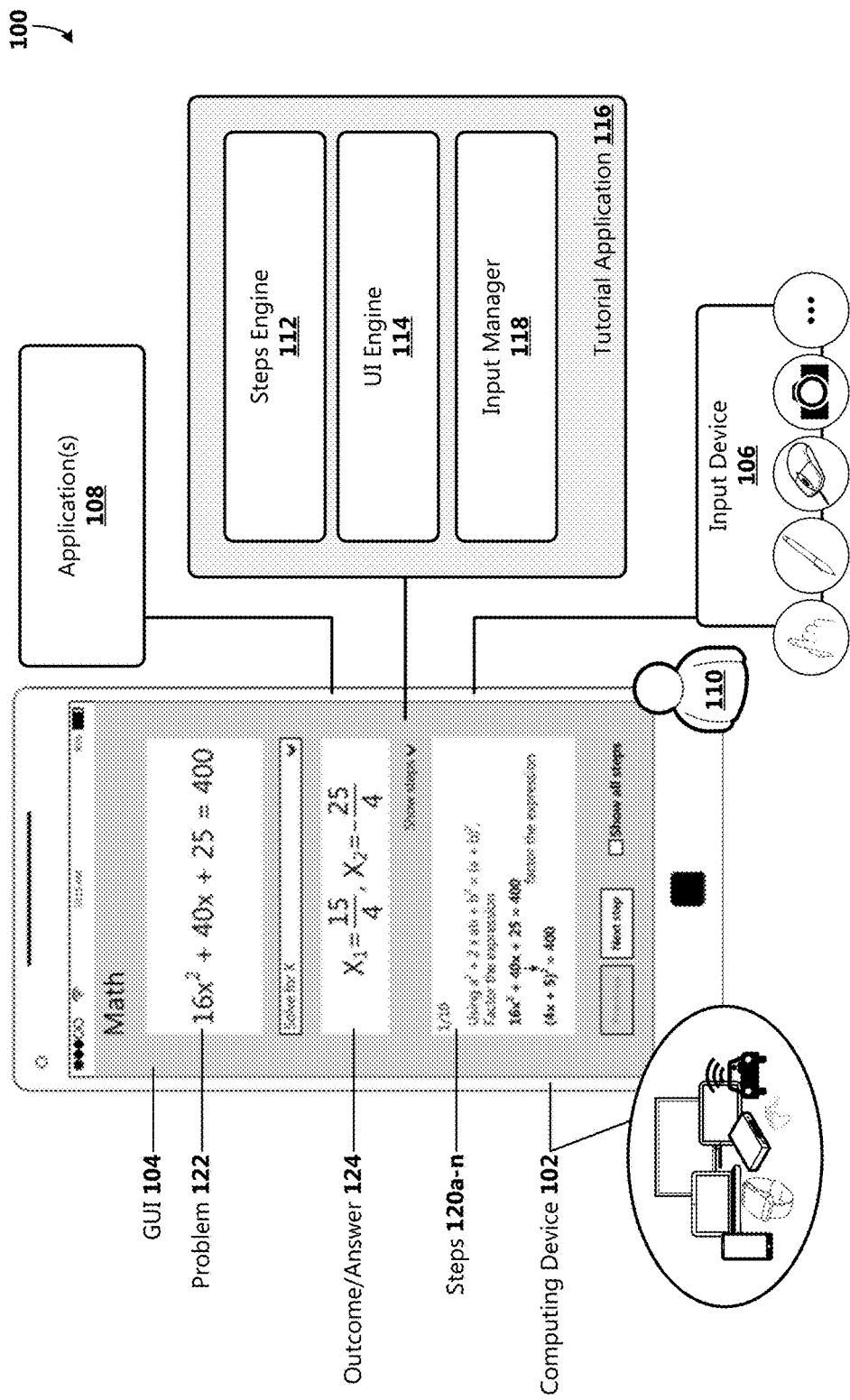
FIG. 1 is a block diagram of an example operating environment including a tutorial application for displaying steps of a solution to a problem.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage media for displaying steps of a solution to a problem. With reference now to FIG. 1, an example operating environment 100 including a tutorial application 116 for displaying steps of a solution to a problem is shown. The example operating environment 100 includes a computing device 102, wherein the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, a connected automobile, a smart home device, or other type of computing device) for executing applications 108,116 for performing a variety of tasks. The hardware of these computing devices is discussed in greater detail in regard to FIGS. 4, 5A, 5B, and 6.

A user may utilize an application 108,116 on a computing device 102 for a variety of tasks, which may include, for example, to write, calculate, draw, organize, prepare and view presentations, send and receive electronic mail, take and organize notes, make music, and the like. According to an aspect, the tutorial application 116 can be utilized to show a plurality of steps 120a-n (collectively 120) of a solution to a problem, such as a mathematical problem, a chemistry problem, a physics problem, a translation, etc. In some examples, the tutorial application 116 can be utilized to shows a plurality of steps 120 of a recipe or other tutorial instructions to achieve a desired answer or outcome 124.

Applications 108,116 may include thick client applications, which may be stored locally on the computing device 102 (as illustrated in FIG. 1), or may include thin client applications (i.e., web applications) that may reside on a remote server and accessible over a network or combination of networks (e.g., the Internet, wide area networks, local area networks). A thin client application may be hosted in a browser-controlled environment or coded in a browser-supported language and reliant on a common web browser to render the application executable on a computing device 102. According to an aspect, the application 108,116 is a program that is launched and manipulated by an operating system, and manages content within the application or an electronic document and published on a display screen. In one example, an application 108 includes a tutorial application API (application programming interface), operative to enable the computing device to employ the tutorial application 116 via stored instructions.

According to examples, a graphical user interface (GUI) 104 is provided for enabling a user 110 to interact with functionalities of the application 108 and with electronic documents through gestures, manipulation of controls, graphical buttons, visual indicators, and the like. Content/content items displayed in the application GUI 104 may vary according the application 108,116 used to provide the electronic document. For example, the content displayed in the GUI 104 of a tutorial application 116 may include: a problem 122 to be solved or a problem for which the user 110 wants to see steps or instructions for achieving a desired answer or outcome 124; the steps 120 for solving the problem or for achieving the desired outcome or answer; and the answer or outcome.

With reference still to FIG. 1, the tutorial application 116 includes: a user interface (UI) engine 114 operative to generate a display of steps 120 of a solution for solving a problem 122 or to achieve a desired answer or outcome 124 in a GUI 104, an input manager 118 operative to receive user input, and a steps engine 112 operative to determine the solution to the problem or the steps to achieve the desired answer or outcome.

The input manager 118 is illustrative of a software module, system, or device operative to receive user input, and communicate the user input in the form of messages. According to aspects, the user input includes a physical act or motion performed on or by an input device 106 at a position of a user-controlled cursor (such as a mouse cursor, a touch-point on a touch-screen interface, a focus-point on a motion gesture detection device, or head, eye, or gaze tracking device). Various user interface technologies may be utilized. For example, user input may be received via hardware input devices, such as mice, keyboards, remote controls, pen/stylus, a camera, and the like. As another example, user input may be received via natural input devices/methods that enable a user 110 to interact with the computing device 102 in a "natural" manner, such as those relying on speech recognition, touch and stylus recognition, gesture recognition both on screen and adjacent to the screen, air gestures, head and eye tracking, voice and speech, vision, touch, hover, gestures, and machine intelligence.

According to an example, the user 110 uses an input device 106 to input a problem 122 for which the user desires to see steps 120 of a solution for solving the problem 122. In some examples, the problem is embodied as a desired outcome 124, such as a food dish for which the user 110 wants to know the instructions for preparing or a task for which the user wants to know the instructions for completing. For example, the user 110 may input a problem 122, such as a math problem, a physics problem, a chemistry problem, a food dish, a task, etc., via typing the problem using a physical or on-screen keyboard, write a problem using a finger, stylus, or digital pen, speak a problem, capture an image of a problem, or select a problem from a menu of problems. The input manager 118 may further include a recognizer, for example, operative to recognize handwriting input or a captured image. As should be appreciated, the above examples are not meant to be limiting. Other user inputs for inputting a problem 122 are possible and are within the scope of the present disclosure. According to an aspect, the input manager 118 is operative to receive the user input, and pass the input to the steps engine 112.

The steps engine 112 is illustrative of a software module, system, or device operative to determine a solution to the received problem 122, wherein the solution comprises a plurality of steps 120 to achieve an answer or outcome 124 to the problem. For example, a solution to a math problem 122 may include a number of mathematical operation steps 120, a solution to a physics problem may include a number of formulas and steps to apply the formulas, a solution to a selection or entry of a food dish may include a number of instructional steps to prepare the particular dish, a solution to a selection or entry of a particular task may include a number of instructional steps to complete the task, etc. In response to a determination of a solution of a problem, the UI engine 114 is operative to update the GUI 104 to display individual steps 120 used to solve the problem. In some examples, the UI engine 114 is further operative to display the answer 124 to the problem 122.

Figure 2A:
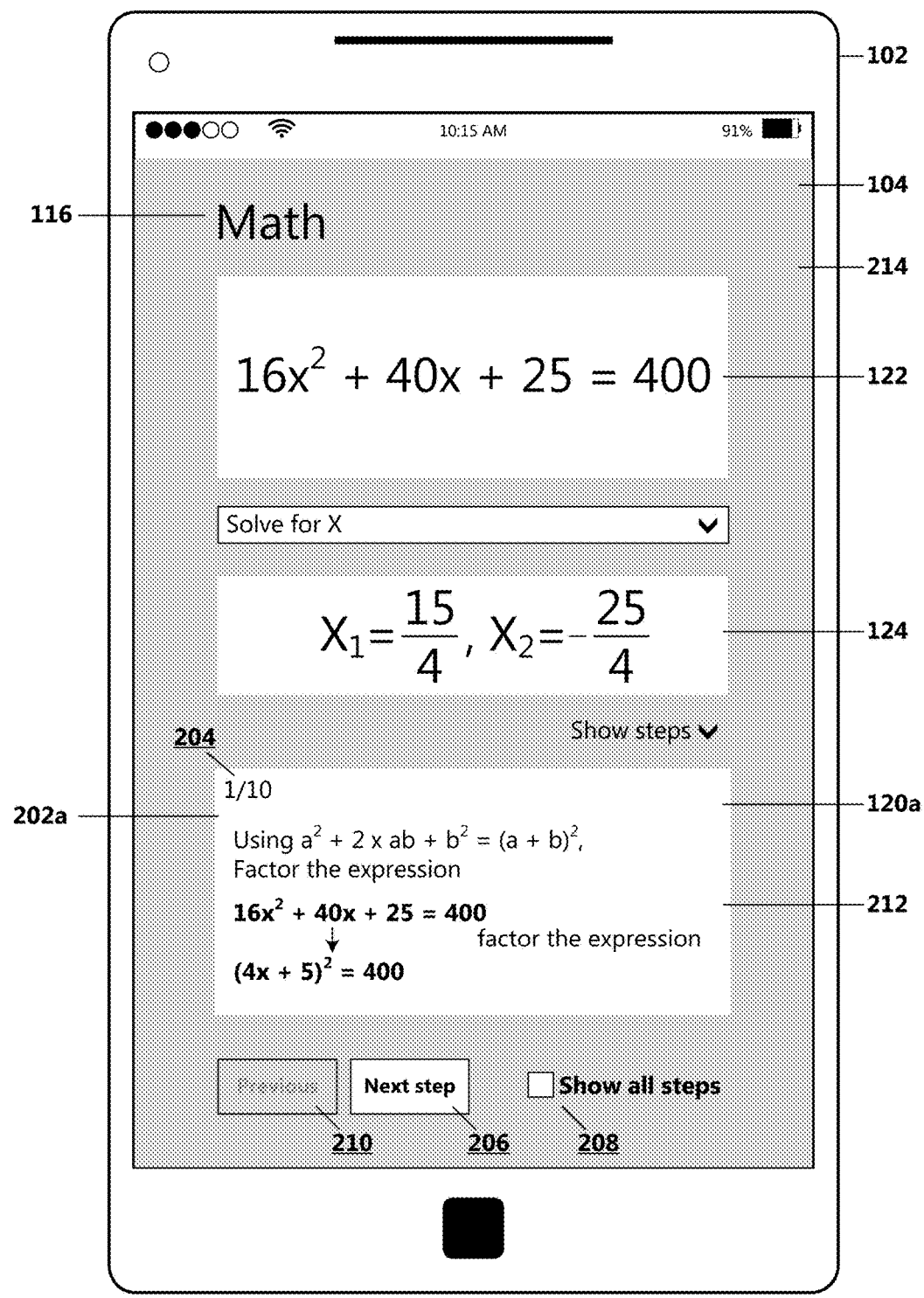
FIG. 2A is an illustration showing an example GUI including a step-by-step mode display of a math problem, an answer to the problem, and a first step of a solution to the problem.
Figure 2B:
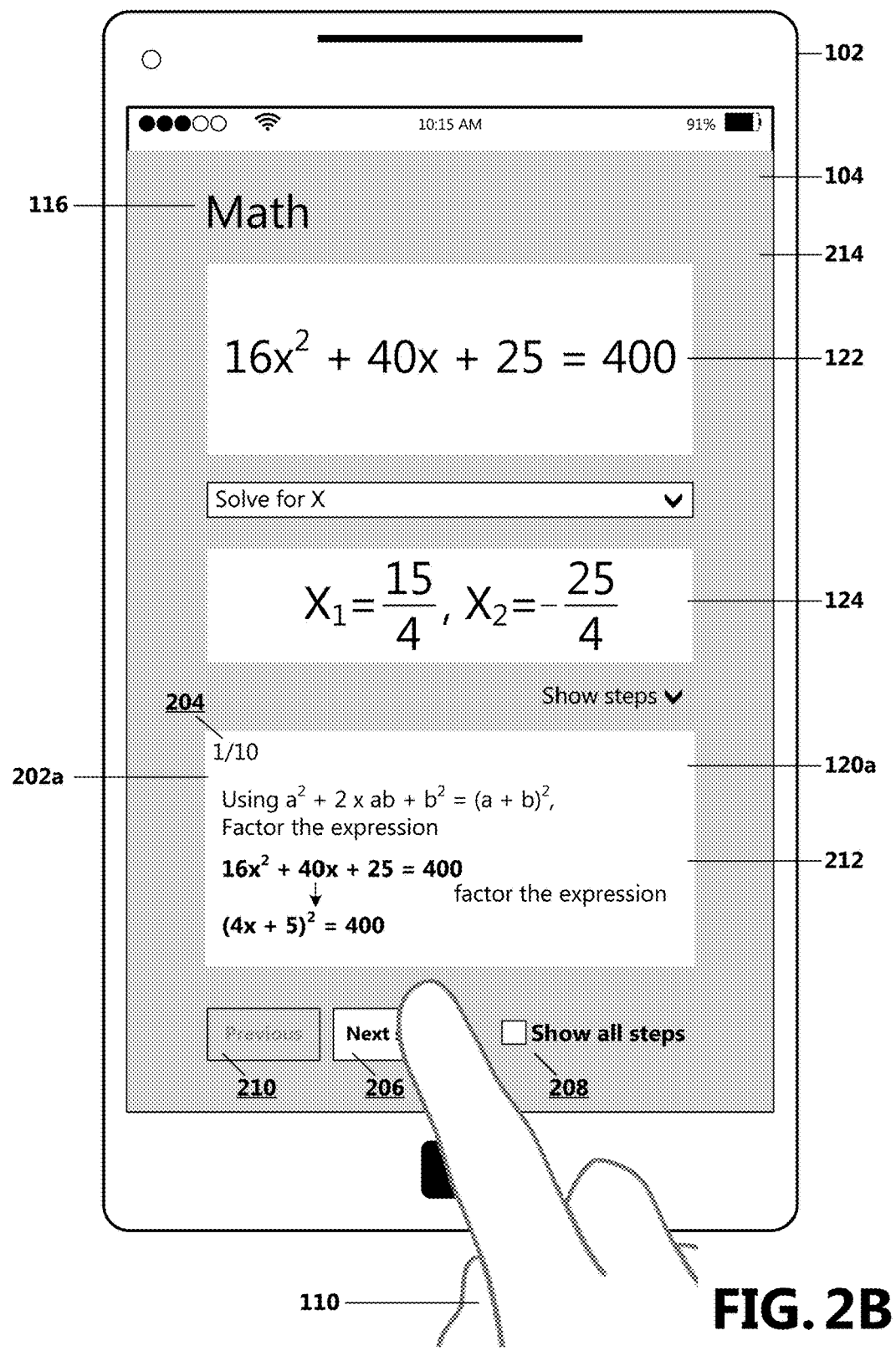
FIG. 2B is an illustration showing a user selecting to navigate to a next step in the solution.
Figure 2C:
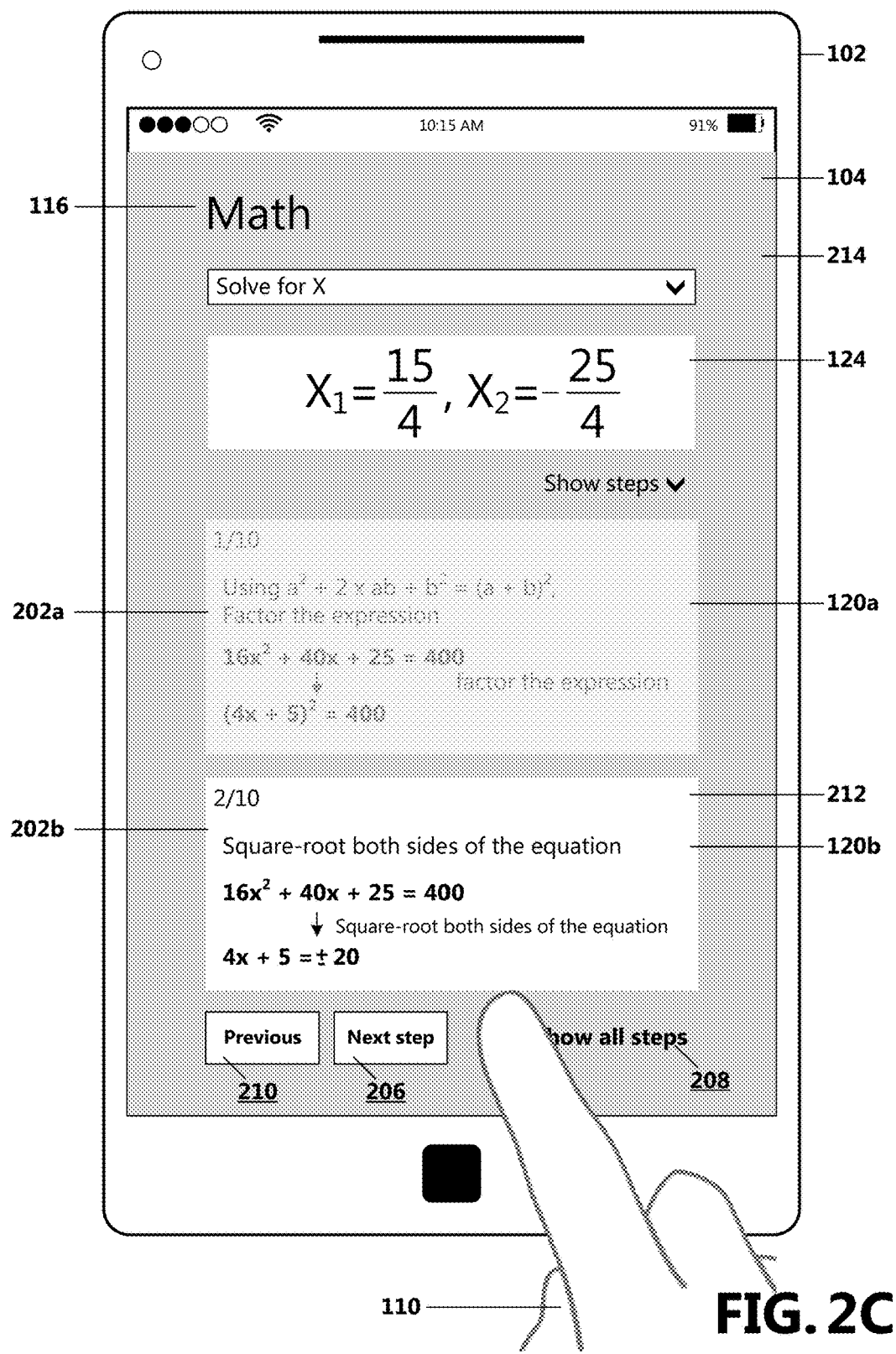
FIG. 2C is an illustration showing the GUI updated to display the next step in the solution and a selection of a mode selector.
Figure 2D:
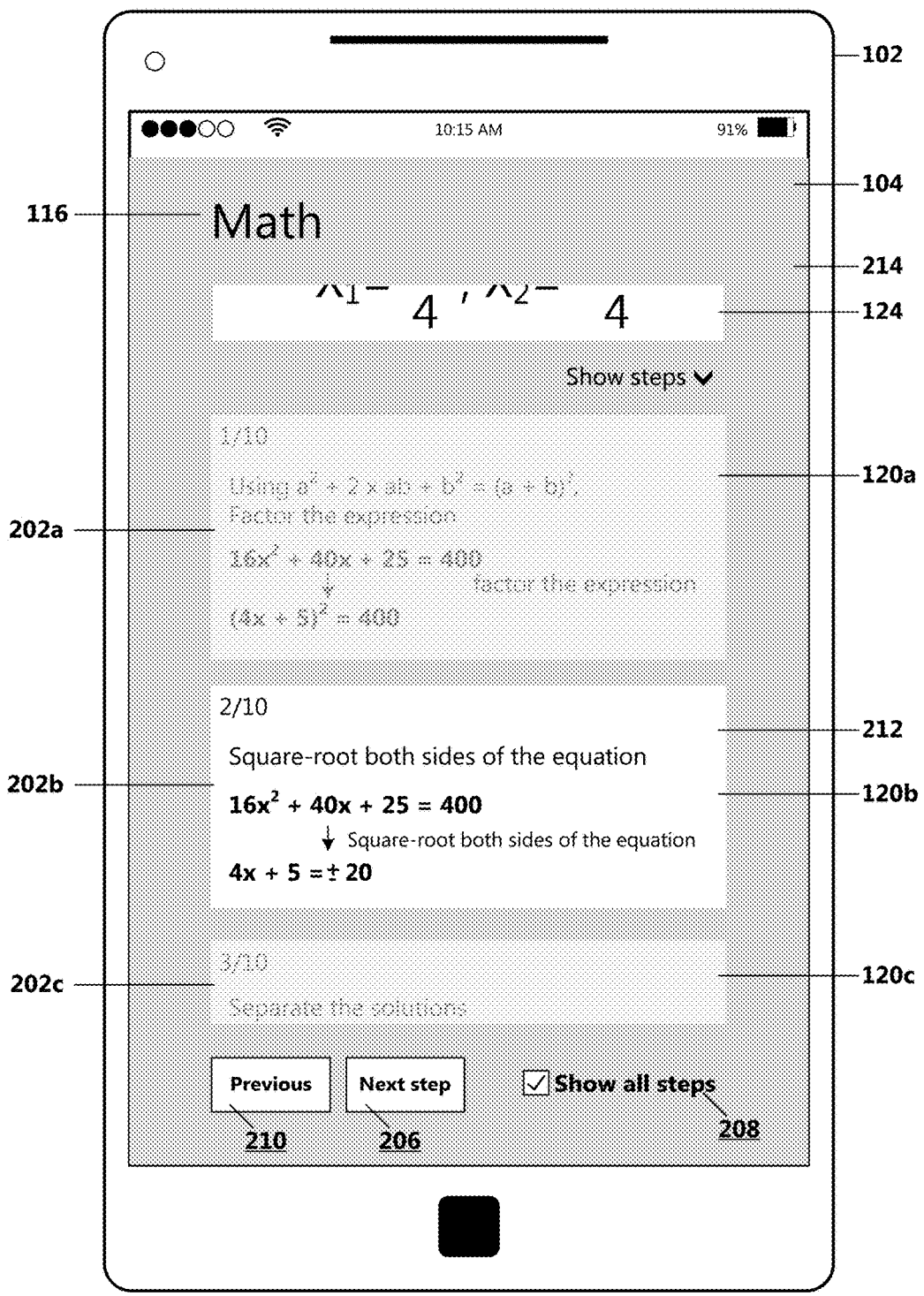
FIG. 2D is an illustration showing steps displayed in an all-steps mode.
Figure 2E:
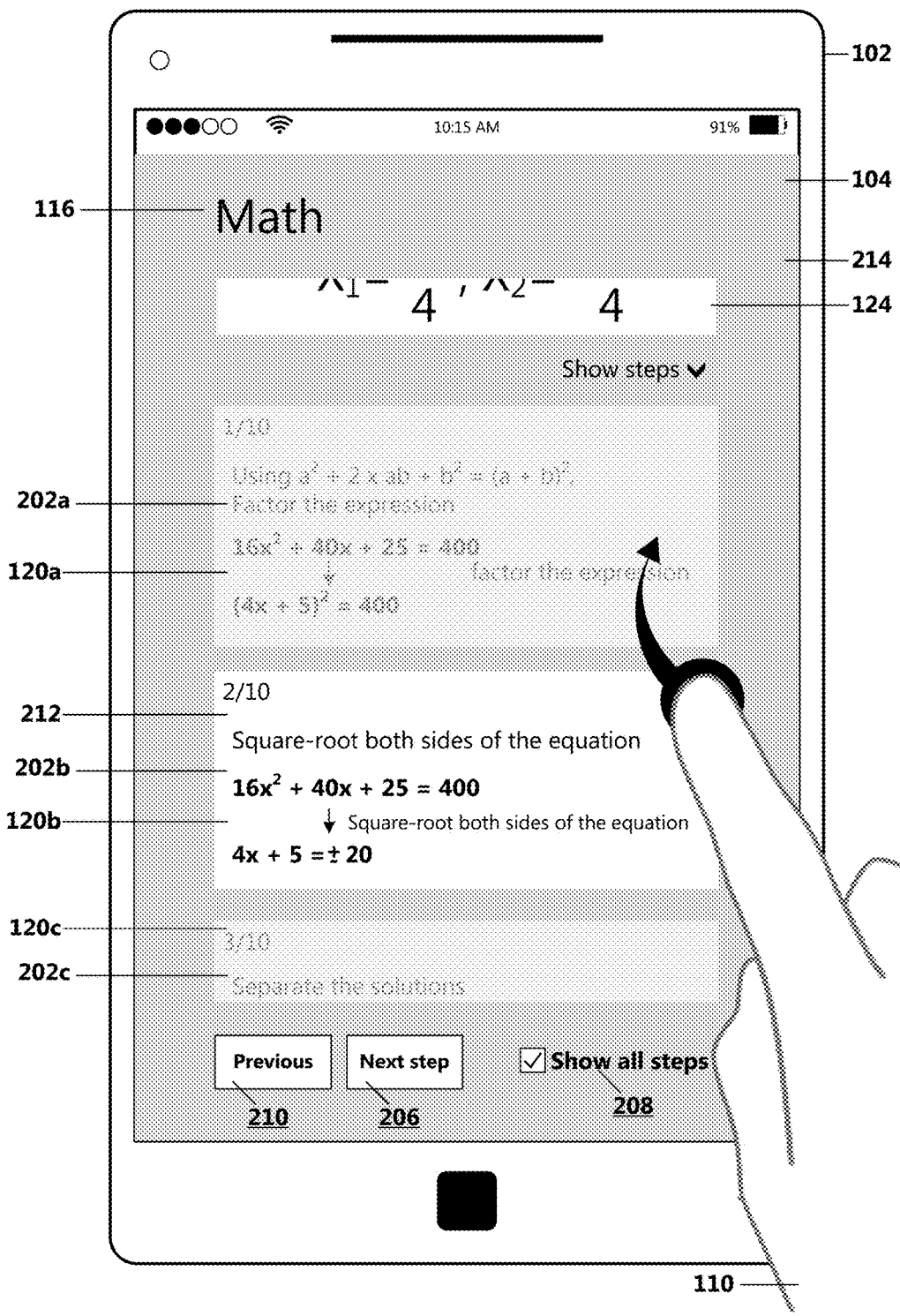
FIG. 2E is an illustration showing the user scrolling the page vertically to navigate forward through steps displayed in the all-steps mode.
Figure 2F:
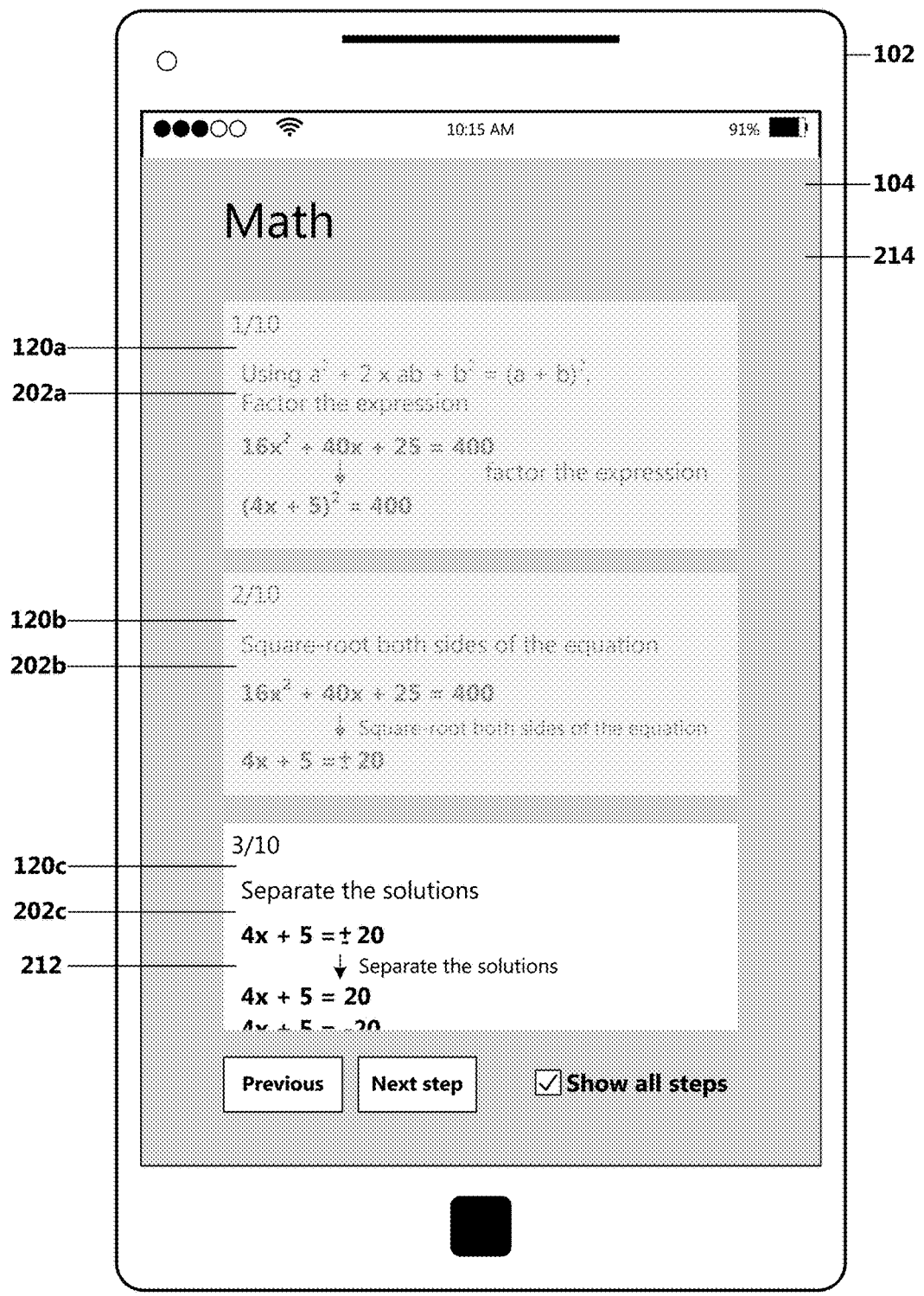
FIG. 2F is an illustration showing movement of the page and an automatic update of the focused step.
Figure 2G:
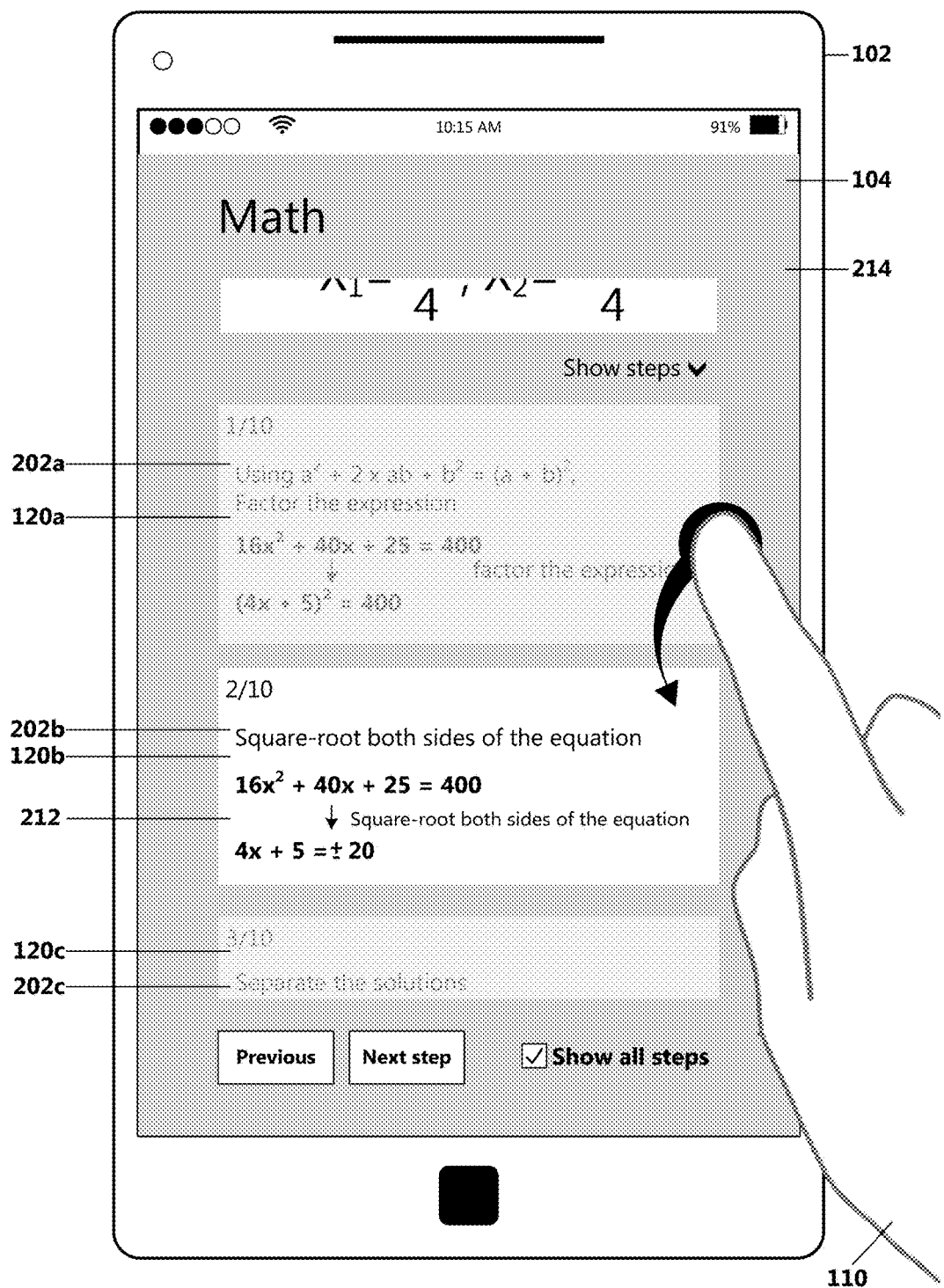
FIG. 2G is an illustration showing the user scrolling the page vertically to navigate backward through steps displayed in the all-steps mode.
Figure 2H:
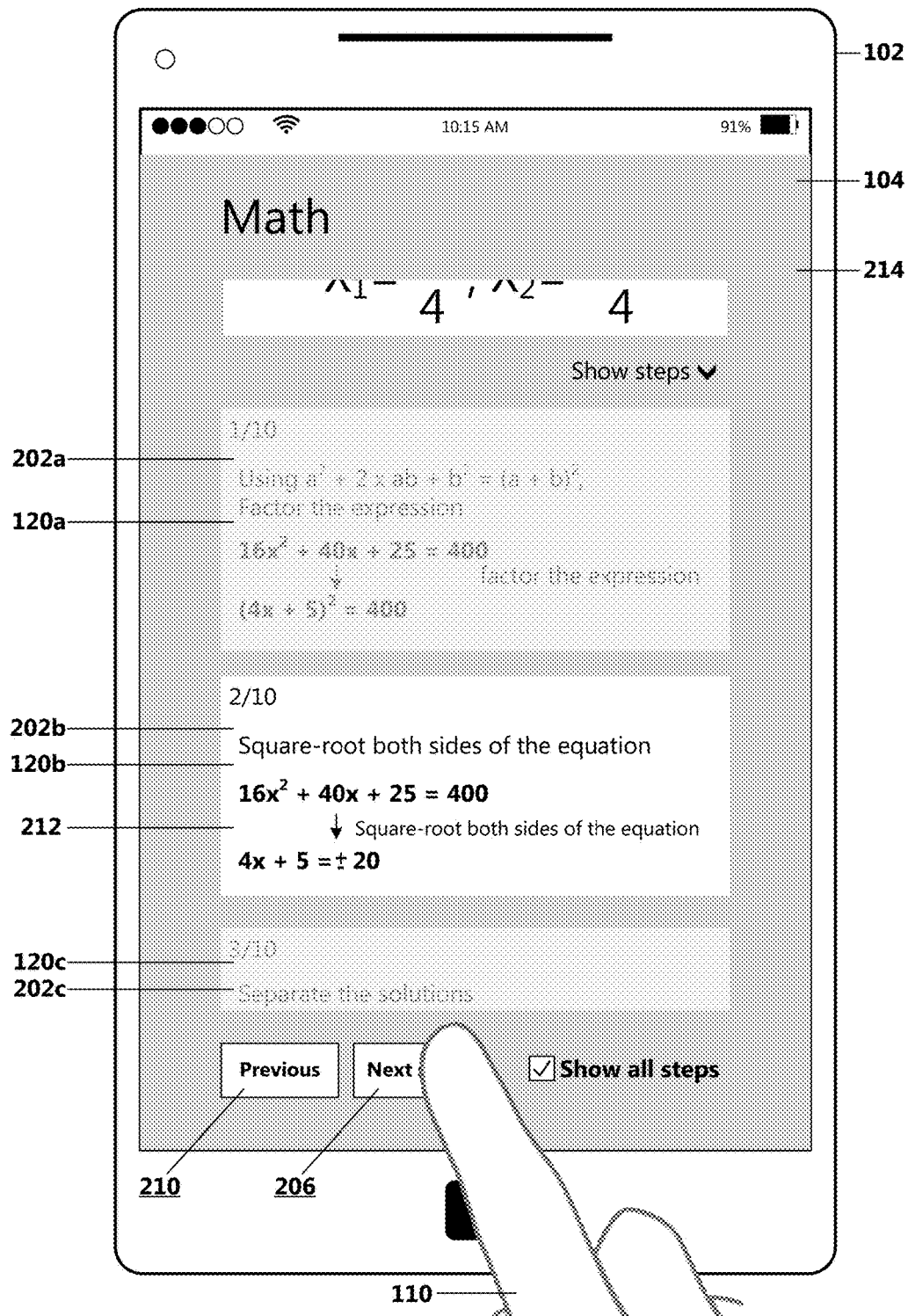
FIG. 2H is an illustration showing the user navigating forward through the steps of the solution in the all-steps mode by selecting the next step control.
Figure 2I:
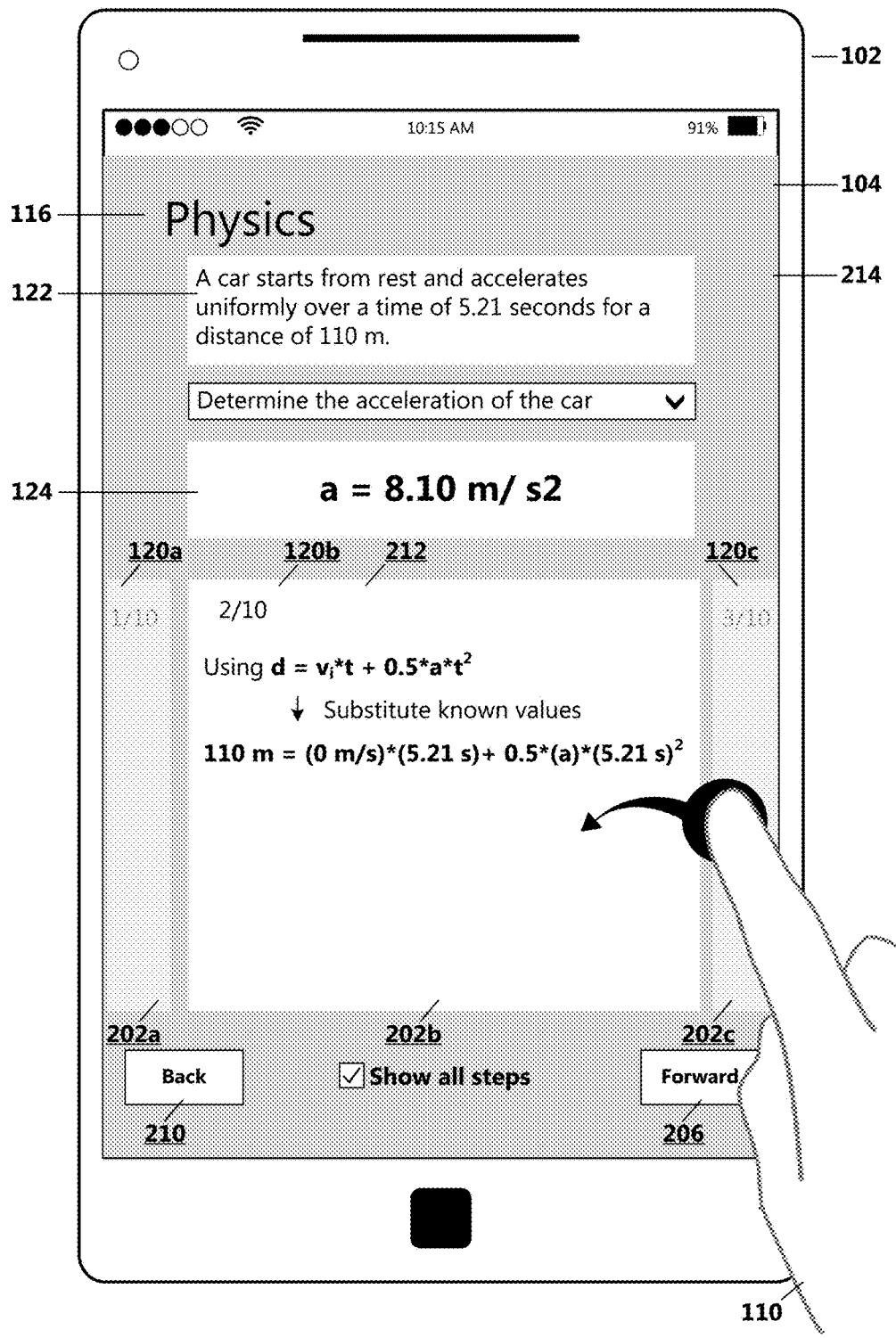
FIG. 2I is an illustration showing an example GUI including an all-steps mode display of a physics problem solution, wherein the steps are displayed horizontally and the user is scrolling between steps horizontally.
Figure 2J:
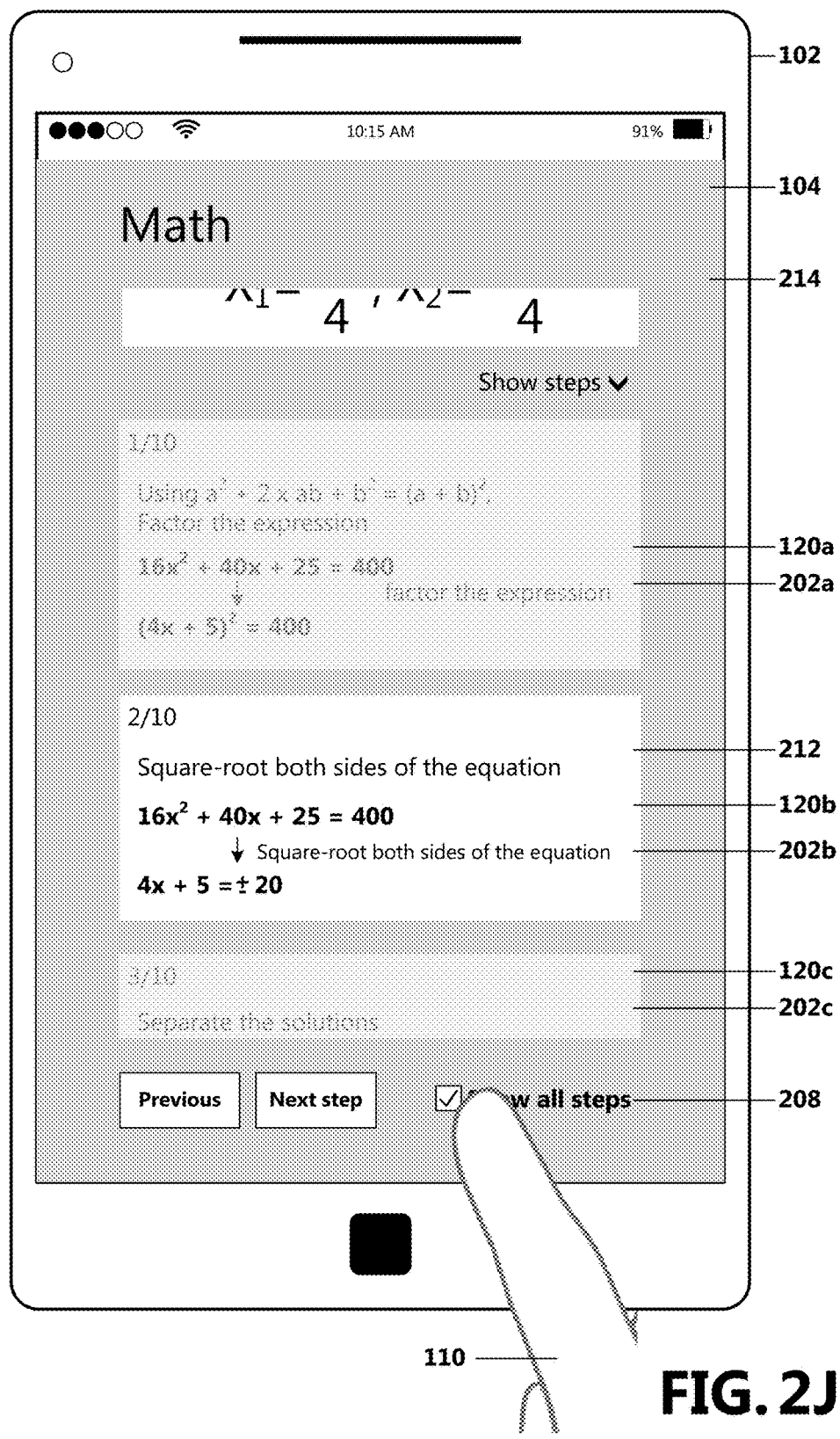
FIG. 2J is an illustration showing the user selectively switching from the all-steps mode to the step-by-step mode.
Figure 2K:
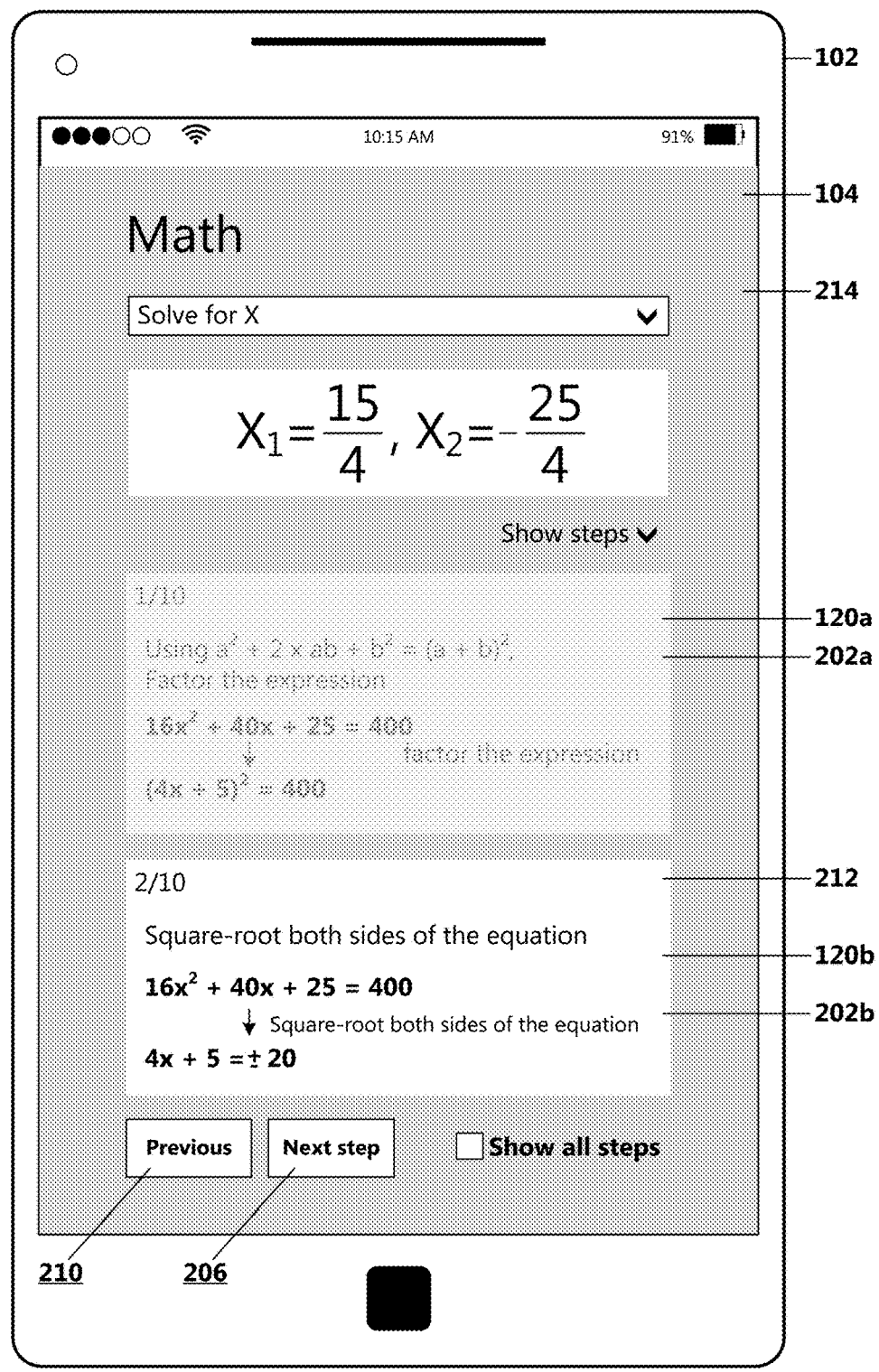
FIG. 2K is an illustration showing a seamless transition from the all-steps mode to the step-by-step mode.
Figure 2L:
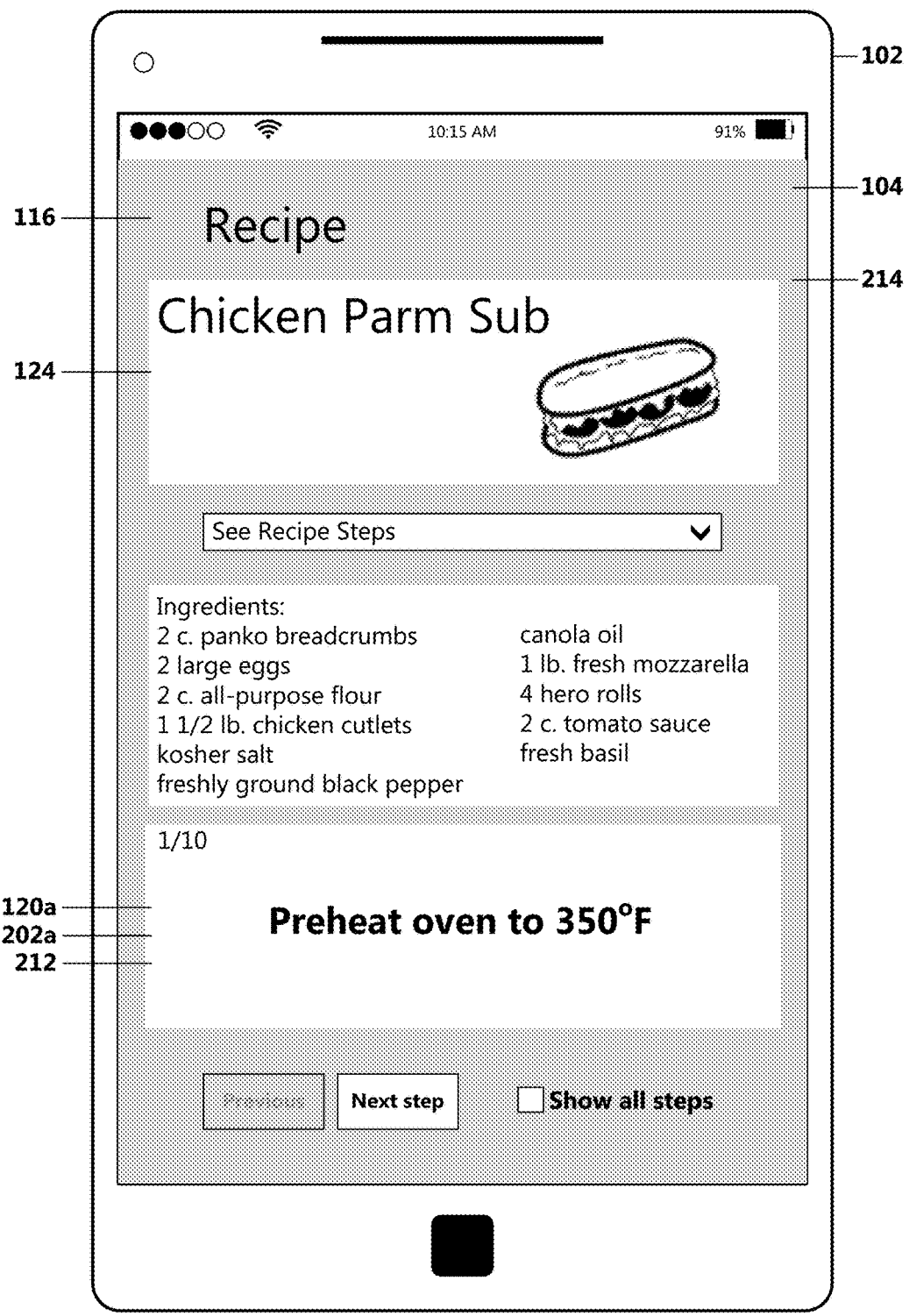
FIG. 2L is an illustration showing an example GUI of a recipe application embodiment of the tutorial application including the step-by-step mode display of recipe steps.
Figure 2M:
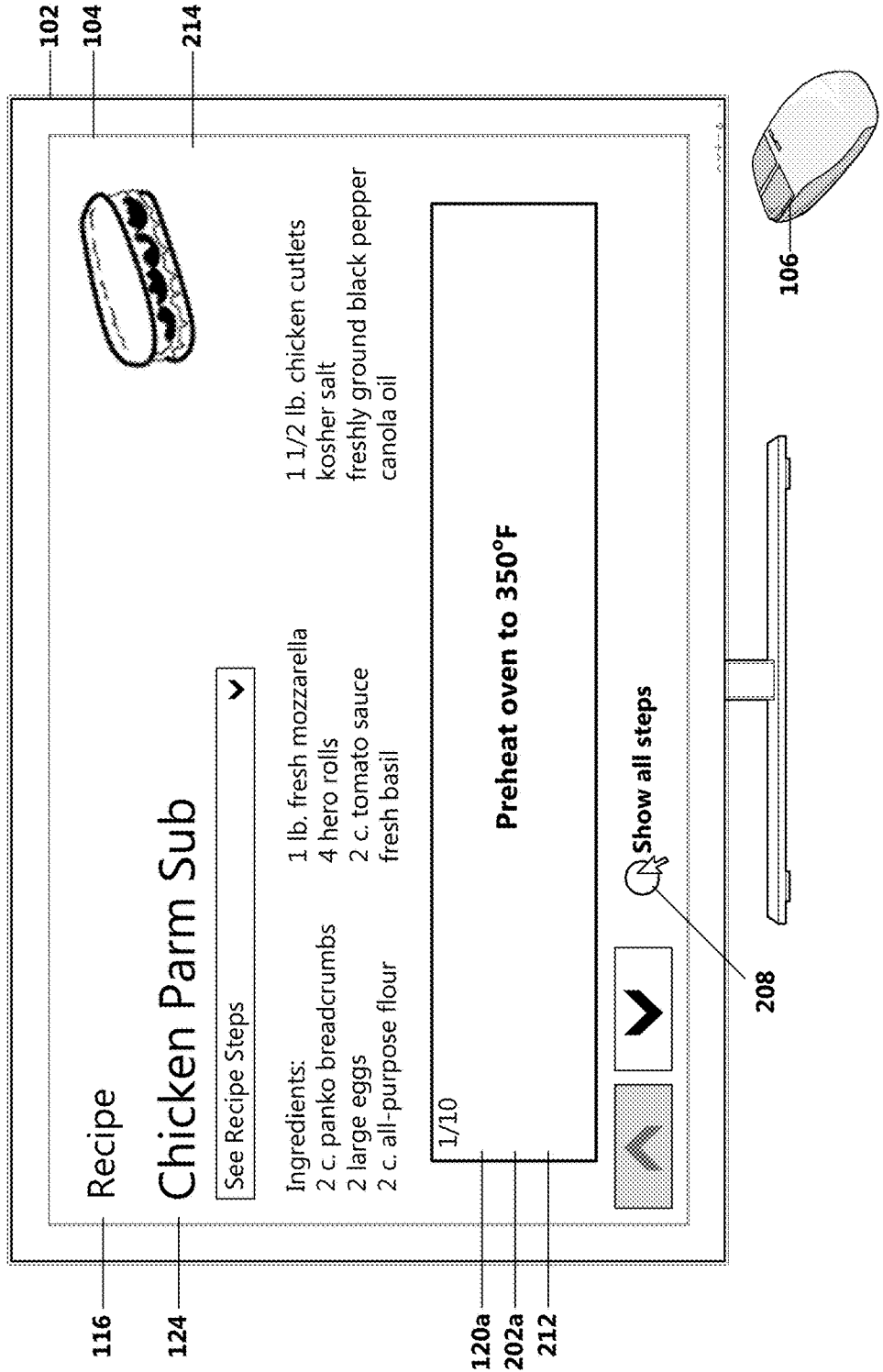
FIG. 2M is an illustration of the GUI displayed on a desktop computer and showing the user selecting the mode selector to switch from the step-by-step mode to the all-steps mode.
Figure 2N:
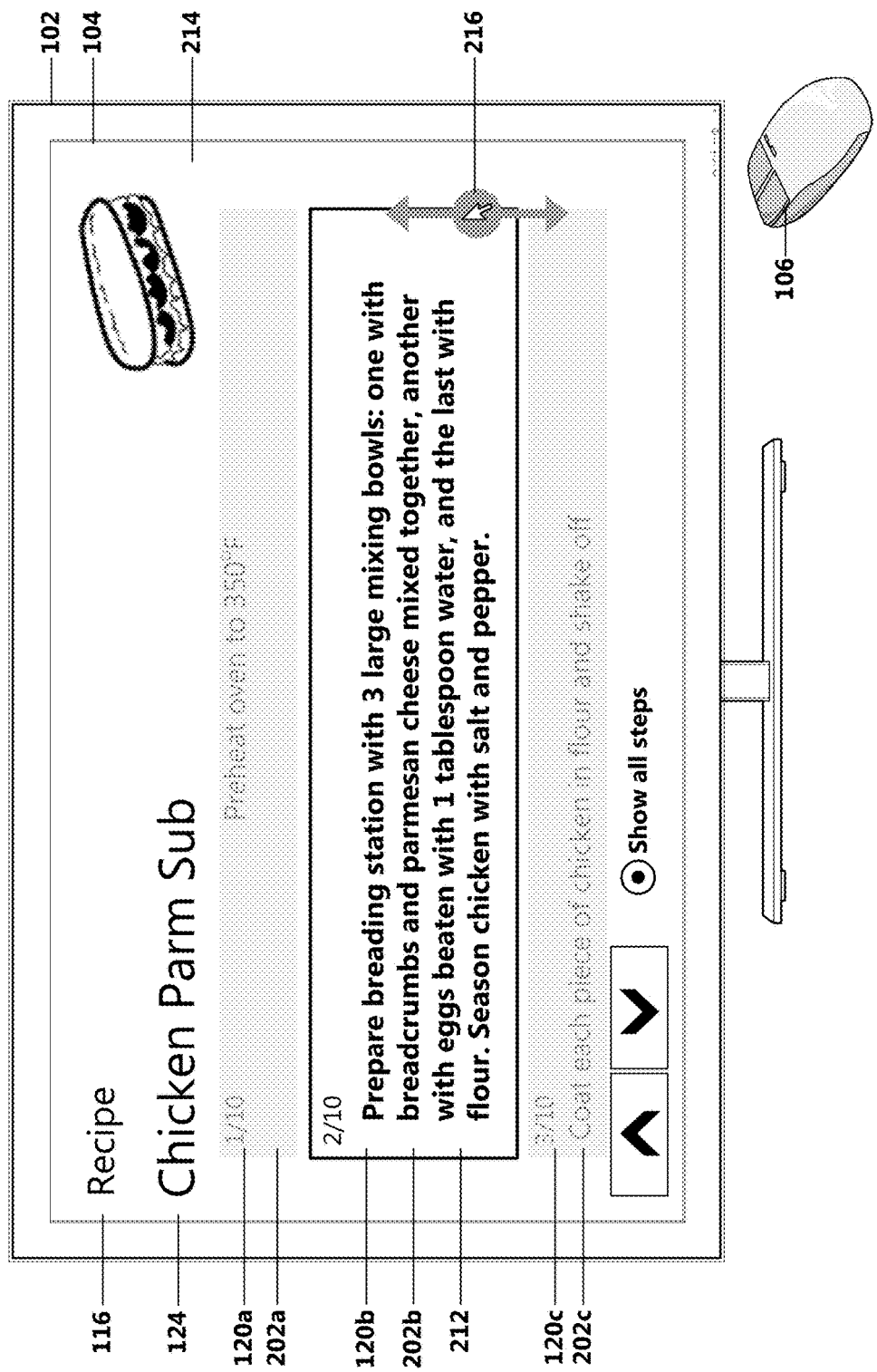
FIG. 2N is an illustration showing a seamless transition from the step-by-step mode to the all-steps mode and the user navigating through the separate steps via a scrolling input.
Figure 2O:
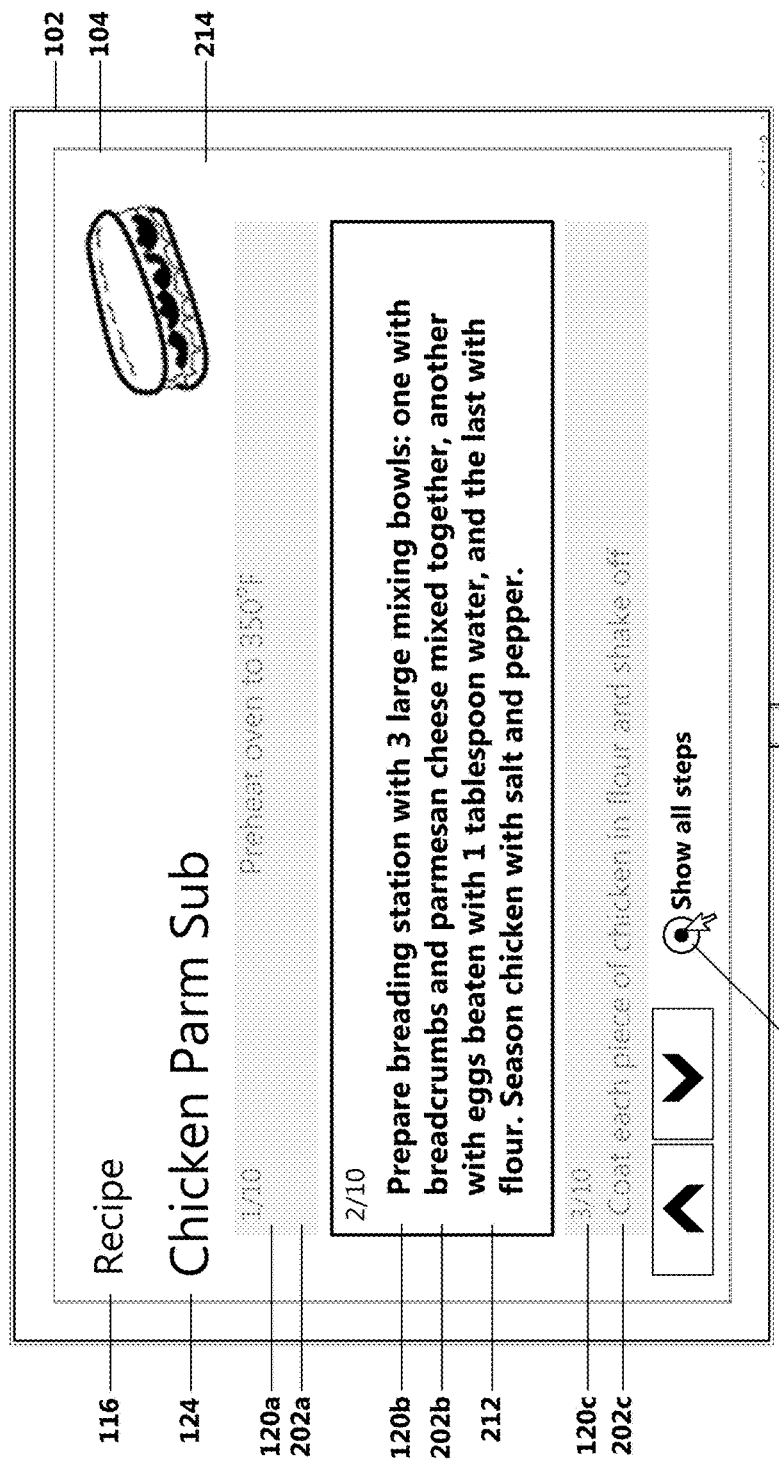
FIG. 2O is an illustration showing the user selecting the mode selector to switch from the all-steps mode to the step-by-step mode.
Figure 2P:
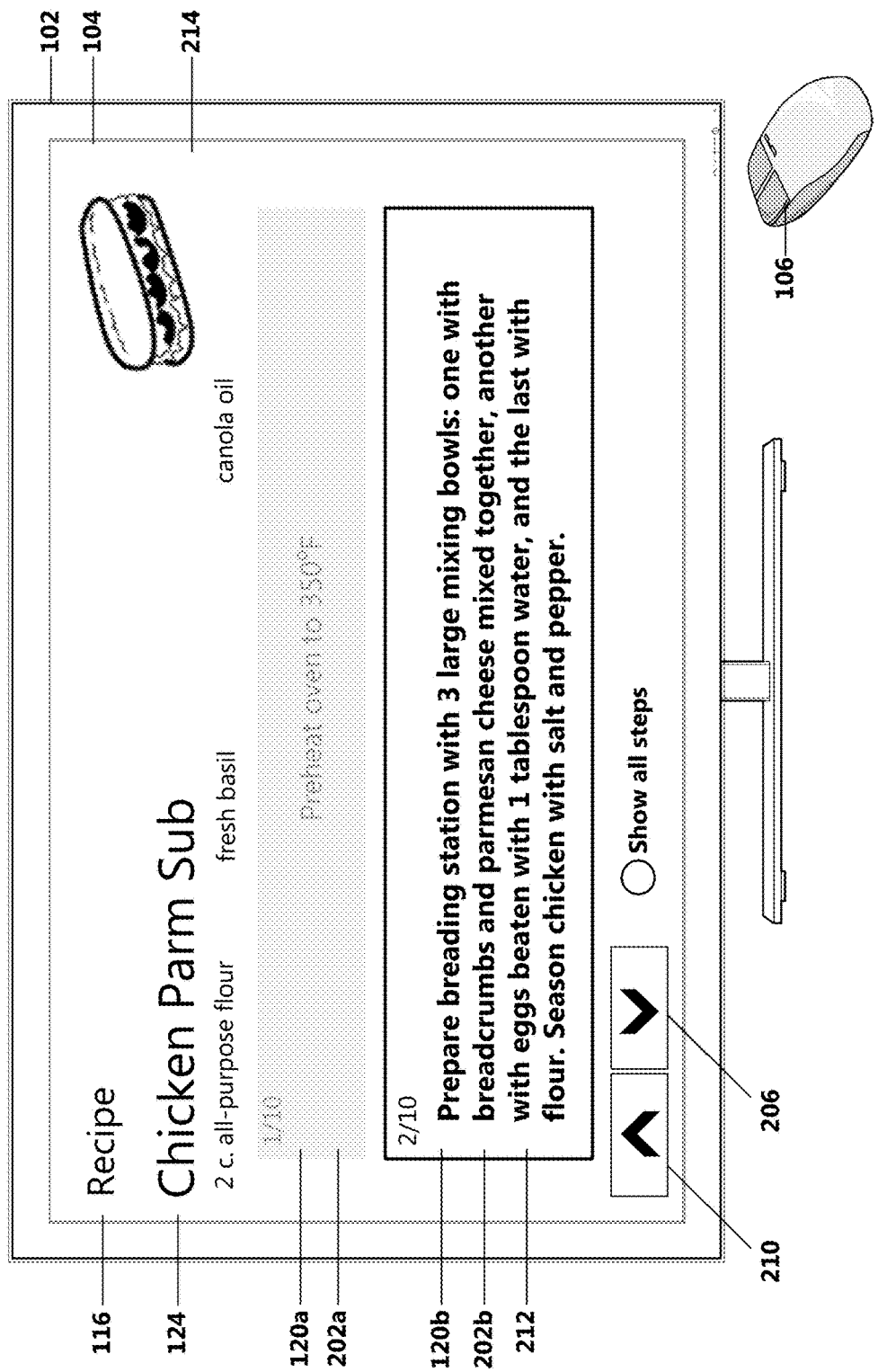
FIG. 2P is an illustration showing a seamless transition from the all-steps mode to the step-by-step mode.

FIGS. 2A-2P are illustrations that show various aspects of providing a user interface for displaying steps 120 of a solution to a problem 122. With reference now to FIG. 2A, the tutorial application 116 is embodied as a math problem solver application. As illustrated, the user 110 has input or selected a math problem 122, and responsive to the input, the steps engine 112 has determined a solution to the received problem, wherein the solution comprises a plurality of steps 120 to achieve the answer 124 to the problem. Accordingly, the UI engine 114 has updated the GUI 104 to display the answer 124.

In one example, the UI engine 114 is operative to generate and display a GUI 104 for the tutorial application 116, wherein problem-solving steps 120 are displayed in separate regions in the GUI. In another example, the UI engine 114 is operative to generate and display a card-based GUI 104 for the tutorial application 116, wherein each step 120 is displayed on an individual card 202, and the cards are sized to accommodate the problem solving step. According to an aspect, individual steps 120 may be displayed on a page 214 in a step-by-step mode or in an all-steps mode. In the step-by-step mode, one step 120 is in focus, and a next step control 206 and/or a previous step control 210 is displayed for enabling the user 110 to selectively move through the solution to the problem 122 one step at a time. According to an aspect, the next step control 206 is a user-actuatable control, such as a button, that when actuated, causes the step after the currently focused step to become the current or focused step. The next step control 206 may be displayed with text, such as "next," "next step," "forward," or may be displayed with a directional symbol, such as an arrow or a chevron pointing in the direction of the next step. The previous step control 210 is a user-actuatable control, that when actuated, causes the step before the currently focused step to become the current or focused step. The previous step control 210 may be displayed with text, such as "previous," "previous step," "back," or may be displayed with a directional symbol, such as an arrow or a chevron pointing in the direction of the previous step. Although the next step control 206 and the previous step control 210 are illustrated as icons or buttons, other types of user-actuatable controls, including gesture-enable controls can be used.

According to an example, the previous step control 210 may be deactivated and grayed out when there is not a previous step in the solution (e.g., when the first step 120a is in focus), and the next step control 206 may be deactivated and grayed out when there is not a next step in the solution (e.g., when the last step 120n of a solution is in focus). As mentioned above, the UI engine 114 is operative to display individual steps 120 used to solve the problem.

According to an aspect, only one step 120 is displayed in focus at a time. In some examples, a focused step 212 is displayed such that the step or the region or card 202 in which the focused step is displayed (focused region/card) is highlighted or visually-distinct from other steps/regions/cards that are not currently in focus. For example, other steps 120 that are displayed but that are not currently in focus may be grayed out, have a transparency effect applied, or may be displayed such that the background of the regions or cards 202 and the steps' contents (e.g., text, numbers, characters, symbols) have a monochromatic color effect, while the focused step 212 may use contrasting colors for clarity and visual interest. According to an aspect, the focused step 212 may be displayed such that the contrast between the background of the card 202 and the step contents (e.g., text, numbers, characters, symbols) is higher than the contrast between the background of regions or cards and steps that are not in focus. In some examples, the focused step 212 is displayed in a generally-static designated region on the screen, such as at the bottom of the screen, at the top of the screen, on the left-hand side of the screen, on the right-hand side of the screen, or in the center of the screen. As can be appreciated, by providing a consistent display of the focused step 212 in a generally-static designated region on the display screen, the user's reading/recognition efficiency is improved.

In some examples, the step-by-step mode is a default mode. As illustrated in FIG. 2A, responsive to a determination of the solution, the UI engine 114 updates the GUI 104 to display a first step 120a of the solution to the problem 122 in a first region or card 202a in the GUI. As illustrated, the first step 120a is the step of focus or the focused step 212. In some examples, the steps 120 are numbered, and a step number 204 is displayed in or adjacent to each region/card 202. According to an aspect, the step number 204 includes an indication of the current step and an indication of the total number of steps 120 (e.g., step 1 of 10 or 1/10).

With reference now to FIG. 2B, the user 110 is shown selecting the next step control 206 to navigate to the next step 120 in the solution to the problem 122 in the step-by-step mode. According to an aspect, the next step control 206 is persistently displayed in a static position on the display. This enables the user 110 to efficiently navigate focus to a next step 120 in a solution by tapping in a single spot on the computing device screen without having to move the user-controlled cursor (e.g., pen, finger, mouse cursor), which, as can be appreciated, helps to increase user interaction performance.

With reference now to FIG. 2C, the UI engine 114 has updated the GUI 104 to display the second step 120b in the solution in a second region/card 202b. According to an aspect and as illustrated, the UI engine 114 updates the GUI 104 to shift the focus to the second step 120b. For example, the UI engine 114 moves the previous step (in this example, step 1 120a) up, grays out the previous step, and the next step (in this example, step 2 120b) becomes the focused step 212.

A mode selector 208 is provided for enabling the user 110 to switch between the step-by-step mode and the all-steps mode. In some examples, selection of the mode selector 208 causes the UI engine 114 to update the GUI 104 to display the solution in the not-current mode. For example, selection of the mode selector 208 when the current mode is the step-by-step mode causes the UI engine 114 to update the GUI 104 to display the solution steps 120 in the all-steps mode, and selection of the mode selector when the current mode is the all-steps mode causes the UI engine to update the GUI to display the solution steps in the step-by-step mode. In some examples, the user is enabled to switch from the step-by-step mode to the all-steps mode by touching on the screen with a finger or stylus and dragging the finger or stylus across the screen in a vertical direction when the steps are displayed vertically, or in a horizontal direction when the steps are displayed horizontally. For example, when in the step-by-step mode, the user 110 may touch on the screen and drag a finger vertically up the screen. Responsive to the scrolling event, the UI engine 114 is operative to update the GUI 104 to display the solution steps 120 in the all-steps mode, where the user is enabled to scroll to navigate through the solution steps. According to an aspect, when switching between the step-by-step mode and the all-steps mode, the transition is seamless, wherein the focused step 212 persists until the user 110 selectively scrolls or navigates to a previous or following step 120.

In the all-steps mode, each of the problem-solving steps 120 are displayed on separate regions or cards 202, and the user 110 is enabled to scroll through the separate regions/cards to view the different steps. According to an aspect, only one of the steps shown on the display is designated as the focused step 212, and is highlighted with respect to other steps/regions/cards or portions thereof shown on the display. According to another aspect, in the all-steps mode, the UI engine 114 is operative to slightly scroll the card of the focused step 212 up to display at least a portion of the next step to provide an indication that there are more steps 120 below/after the focused step. In FIG. 2C, the user 110 is shown selecting the mode selector 208 for switching from the step-by-step mode to the all-steps mode.

With reference now to FIG. 2D, responsive to a selection of the mode selector 208, the UI engine 114 updates the GUI 104 to the all-steps mode, where the second step 120b in the solution is displayed in a second region/card 202b as the focused step 212, and at least a portion of the previous step (in this example, step 1 120a) and the next step (in this example, step 3 120c displayed in a third region/card 202c) are included in the display. As illustrated, the focused step/card is highlighted or displayed as visually-distinct from the previous and next steps.

As described above, in the all-steps mode, the user 110 is enabled to scroll through the separate regions/cards 202 to view the different steps 120. According to one example and as illustrated in FIG. 2E, when the computing device 102 has a touchscreen display, the user 110 is enabled to navigate through the steps 120 of the solution by touching on the screen with a finger or stylus and dragging the finger or stylus across the screen in a vertical or horizontal direction. For example, in FIG. 2E, the user 110 selectively scrolls the page 214 by dragging his/her finger vertically up the screen. Responsive to the scrolling event, the UI engine 114 updates the GUI 104 to move the page 214 so that content (i.e., steps 120) below what was previously displayed content can be brought into view.

For example and as illustrated in FIG. 2F, the page 214 has been moved such that the answer 124 is no longer displayed, and the first three steps 120a,b,c have been moved up on the display. According to an aspect, when the page 214 is scrolled in the all-steps mode, the UI engine 114 is operative to automatically update the focused step 212. For example and as illustrated, at the start of the scrolling event, the second step 120b is the focused step 212. As the user 110 scrolls the page 214, the focus automatically moves to the third step 120c.

FIG. 2G shows the user 110 scrolling up the page 214 by dragging his/her finger vertically down the screen. Responsive to the scrolling event, the UI engine 114 is operative to update the GUI 104 to move the page 214 so that content (i.e., steps 120) above the previously displayed content can be brought into view.

According to one example and as illustrated in FIG. 2H, the user 110 is enabled to navigate through the steps 120 of the solution in the all-steps mode by selecting the next step control 206 or the previous step control 210. For example, responsive to a selection of the next step control 206, the UI engine 114 is operative to update the GUI 104 to move the page 214 so that the next step after the focused step 212 is brought into view and is automatically designated as the focused step.

FIG. 2I is an illustration of a GUI 104 of a tutorial application 116, wherein the tutorial application is embodied as a physics problem solver application. In the illustrated example, the steps 120 are displayed horizontally. For example, the focused step 212 is generally-statically displayed in the center of the page 214, the step previous to the focused step (in this example, step 1 120a) is displayed in a first region/card 202a to the left of the focused step, and the step subsequent to the focused step (in the example, step 3 120c) is displayed in a third region/card 202c to the right of the focused step. The user 110 is enabled to navigate through the steps 120 of the solution in the all-steps mode by scrolling horizontally across the page, while the focused step 212 automatically updates to the step displayed in the center of the page 214. In this example, the next step control 206 and the previous step control 210 are displayed as buttons that read "forward" and "back" respectively.

With reference now to FIG. 2J, the user 110 is shown selecting the mode selector 208 to switch from the all-steps mode to the step-by-step mode. Responsive to the selection and as illustrated in FIG. 2K, the UI engine 114 updates the GUI 104 to display the steps 120 of the solution in the step-by-step mode. For example, the focused step 212 is slightly scrolled down such that the next step is removed from the display. Further, scrolling through steps 120 is disabled, and the user 110 is allowed to move through the problem solving steps 120 one card at a time via a selection of the next step control 206 and the previous step control 210.

FIG. 2L is an illustration of a GUI 104 of a tutorial application 116, wherein the tutorial application is embodied as a recipe application, where steps 120 of a recipe to achieve a desired answer or outcome 124 are displayed. In the illustrated example, a first step 120a of the recipe steps is displayed in the step-by-step mode.

FIG. 2M is an illustration showing the GUI 104 of the recipe application embodiment of the tutorial application 116 displayed on a desktop computer 102 screen, for example, where a mouse or touchpad may be utilized as the input device 106. In the illustrated example, the user 110 is shown selecting the mode selector 208 to switch from the step-by-step mode to the all-steps mode. Responsive to the selection of the mode selector 208 and as illustrated in FIG. 2N, the UI engine 114 updates the GUI 104 to display the recipe steps 120 in the all-steps mode. For example, the UI engine 114 updates the GUI 104 to scroll the region/card of the focused step 212 up to display at least a portion of the next step to provide an indication that there are more steps 120 below/after the focused step. Further, scrolling is enabled, allowing the user 110 to navigate through the separate regions/cards via a scrolling input to view the different steps. For example and as illustrated in FIG. 2N, when using a mouse as the input device 106, the user 110 may scroll up or down the page 214 by using a scroll wheel or by clicking and moving the cursor 216 up to scroll down the page, or by clicking and moving the cursor down to scroll up the page.

FIG. 2O shows the user 110 selecting the mode selector 208 to seamlessly switch from the all-steps mode back to the step-by-step mode. Responsive to the selection and as illustrated in FIG. 2P, the UI engine 114 updates the GUI 104 to display the steps 120 in the step-by-step mode. For example, the focused step 212 is slightly scrolled down such that the next step is removed from the display. Further, scrolling through steps 120 is disabled, and the user 110 is allowed to move through the problem solving steps 120 one card at a time via a selection of the next step control 206 and the previous step control 210. The examples illustrated in FIGS. 2M-2P, the next step control 206 and the previous step control 210 are displayed as chevrons.

Figure 3:
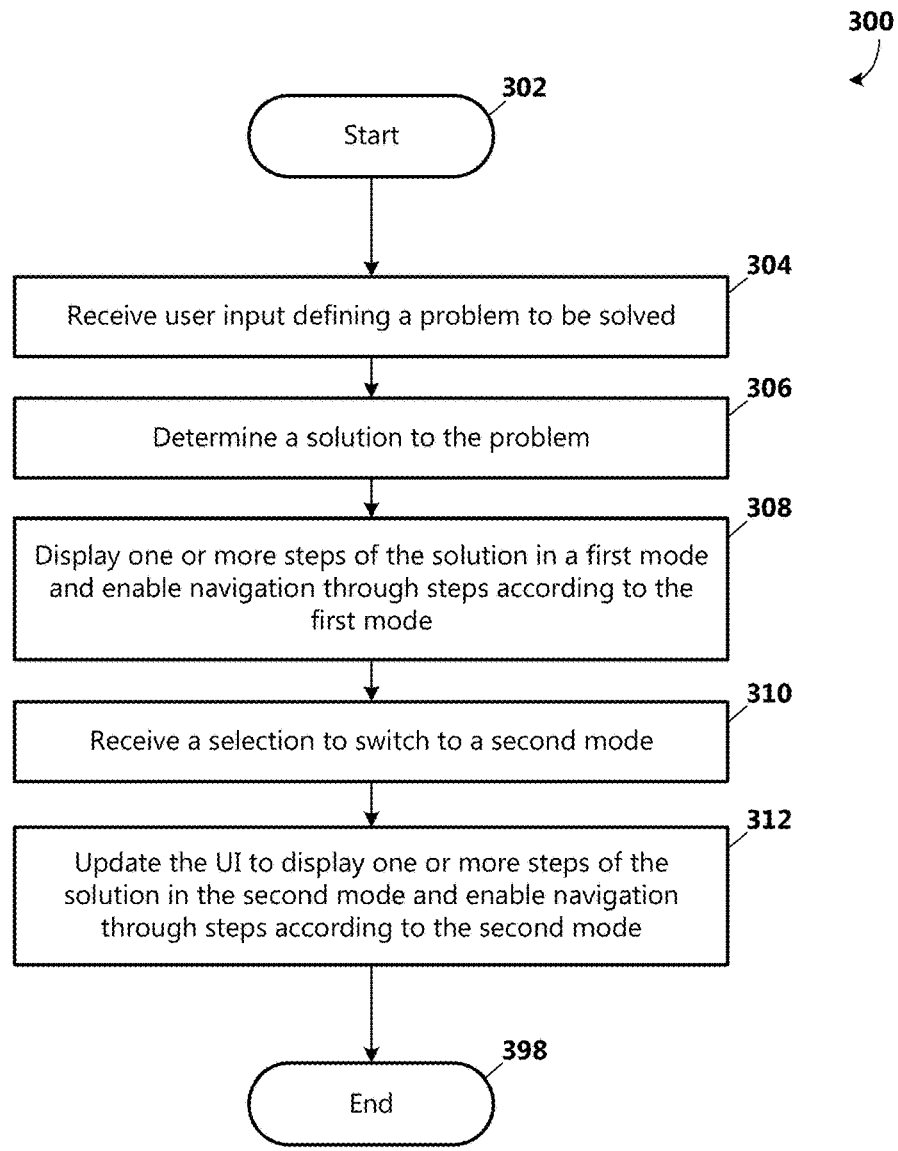
FIG. 3 is a flow chart showing general stages involved in an example method for displaying steps of a solution to a problem.

FIG. 3 is a flow chart showing general stages involved in an example method 300 for displaying steps of a solution to a problem for improved user interaction. The method 300 starts at OPERATION 302, and proceeds to OPERATION 304, where the tutorial application 116 is opened, and user input is received for defining a problem 122 for which the user 110 desires to see steps 120 of a solution for solving the problem. For example, the user 110 may input a problem 122, such as a math problem, a physics problem, a chemistry problem, a food dish, a task, etc. In some examples, the problem is embodied as a desired outcome 124, such as a food dish for which the user 110 wants to know the instructions for preparing or a task for which the user wants to know the instructions for completing. The user 110 may type the problem 122 using a physical or on-screen keyboard, write a problem using a finger, stylus, or digital pen, speak a problem, capture an image of a problem, or select a problem from a menu of problems.

The method 300 proceeds to OPERATION 306, where the tutorial application 116 determines a solution to the problem 122, wherein the solution comprises a plurality of steps 120 to achieve an answer or outcome 124 to the problem.

The method 300 proceeds to OPERATION 308, where the UI engine 114 updates the GUI 104 to display the first step 120a of the plurality of steps 120 according to a first mode. For example, the first mode may be the step-by-step mode, wherein the first step 120a is displayed as the focused step 212, and wherein the focused step is highlighted and displayed in a predetermined and generally-static position on the display. Further, in the step-by-step mode, navigation to a next step is enabled via a selection of the next step control 206, wherein responsive to navigation to the next step, the next step becomes the focused step 212. Navigation to a previous step is enabled via a selection of the previous step control 210, wherein responsive to navigation to the previous step, the previous step becomes the focused step 212.

As another example, the first mode may be the all-steps mode, wherein the first step 120a is displayed as the focused step 212 in a predetermined position on the page 214. According to examples, the focused step is highlighted and scrolled slightly up such that at least a portion of the next step is visible to indicate to the user 110 that there are more steps 120 below/after the focused step. Further, in the all-steps mode, scrolling is enabled for allowing the user 110 to scroll to a desired step 120 in the solution. As the user scrolls, the focused step 212 is automatically updated to the step 120 located at the predetermined position on the page. Navigation to a previous or a next step is also enabled via a selection of the previous step control 210 and the next step control 206 respectively.

The method 300 proceeds to OPERATION 310, where a selection is received to switch the viewing mode to a second mode, for example, from the step-by-step mode to the all-steps mode or from the all-steps mode to the step-by-step mode. According to an aspect, the selection to switch from the first mode to the second mode is made via a selection of the mode selector 208.

The method 300 proceeds to OPERATION 312, where responsive to the mode-switch selection, the GUI 104 is smoothly updated to display steps 120 of the solution according to the second mode. For example, when transitioning from the step-by-step mode to the all-steps mode, the focused step is scrolled slightly up such that at least a portion of the next step is visible to indicate to the user 110 that there are more steps 120 below/after the focused step, and scrolling is enabled for allowing the user to scroll to a desired step in the solution. When transitioning from the all-steps mode to the step-by-step mode, scrolling is disabled, and the user 110 is enabled to navigate between steps one at a time. For example, navigation from the focused step 212 to a previous step or a next step is enabled via a selection of the previous step control 210 and the next step control 206 respectively. The method 300 ends at OPERATION 398.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
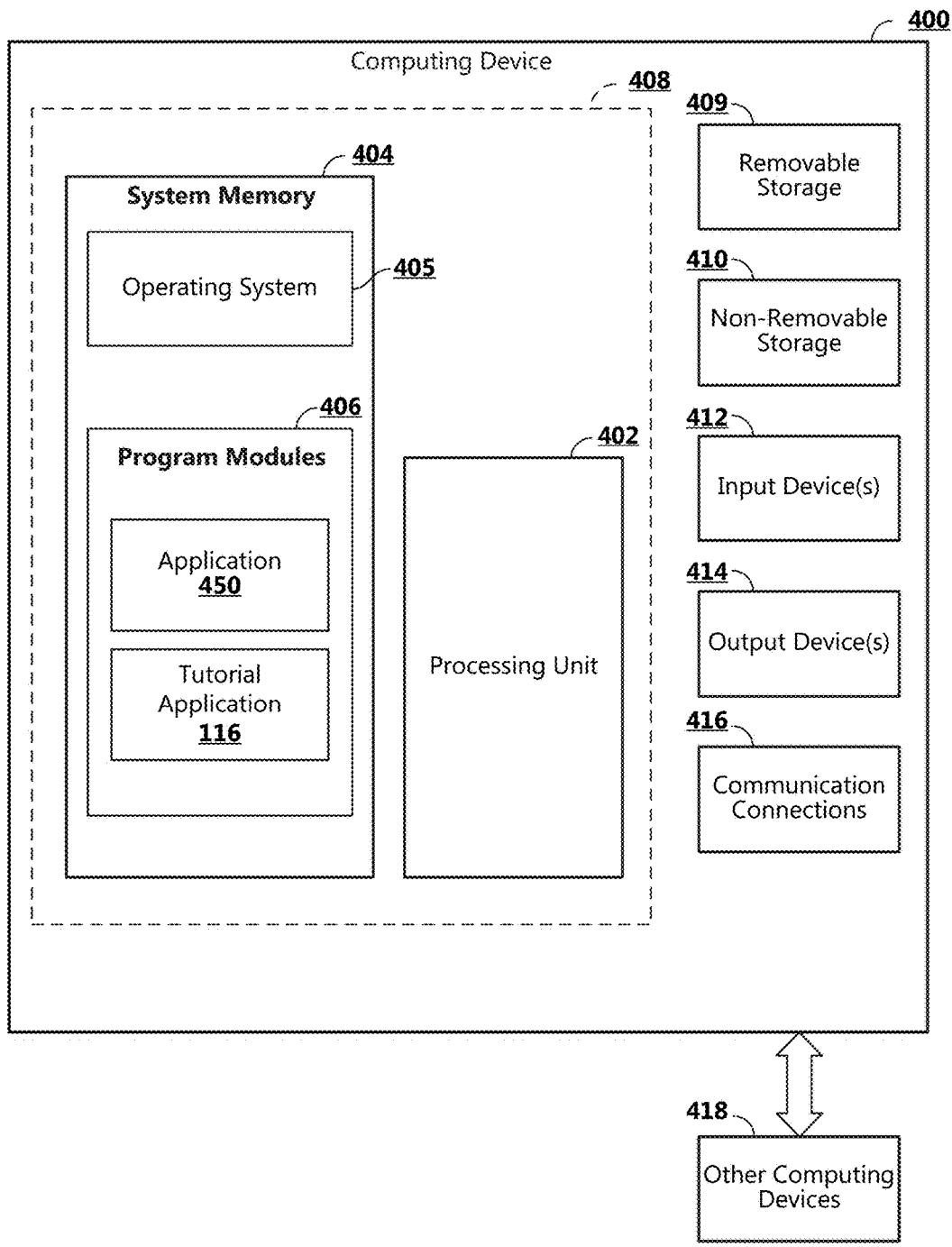
FIG. 4 is a block diagram illustrating example physical components of a computing device.
Figure 5A:
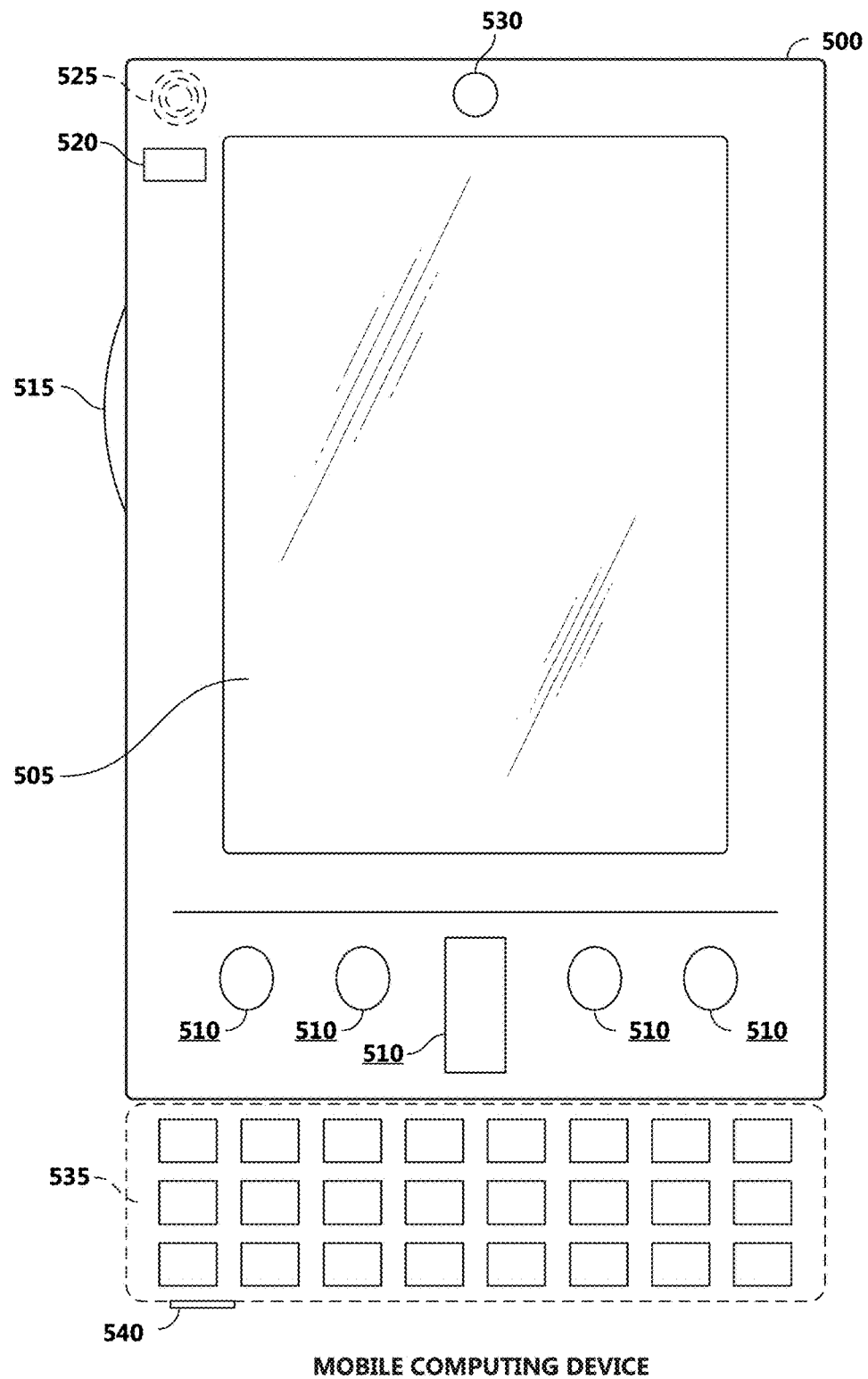
FIGS. 5A and 5B are simplified block diagrams of a mobile computing device.
Figure 5B:
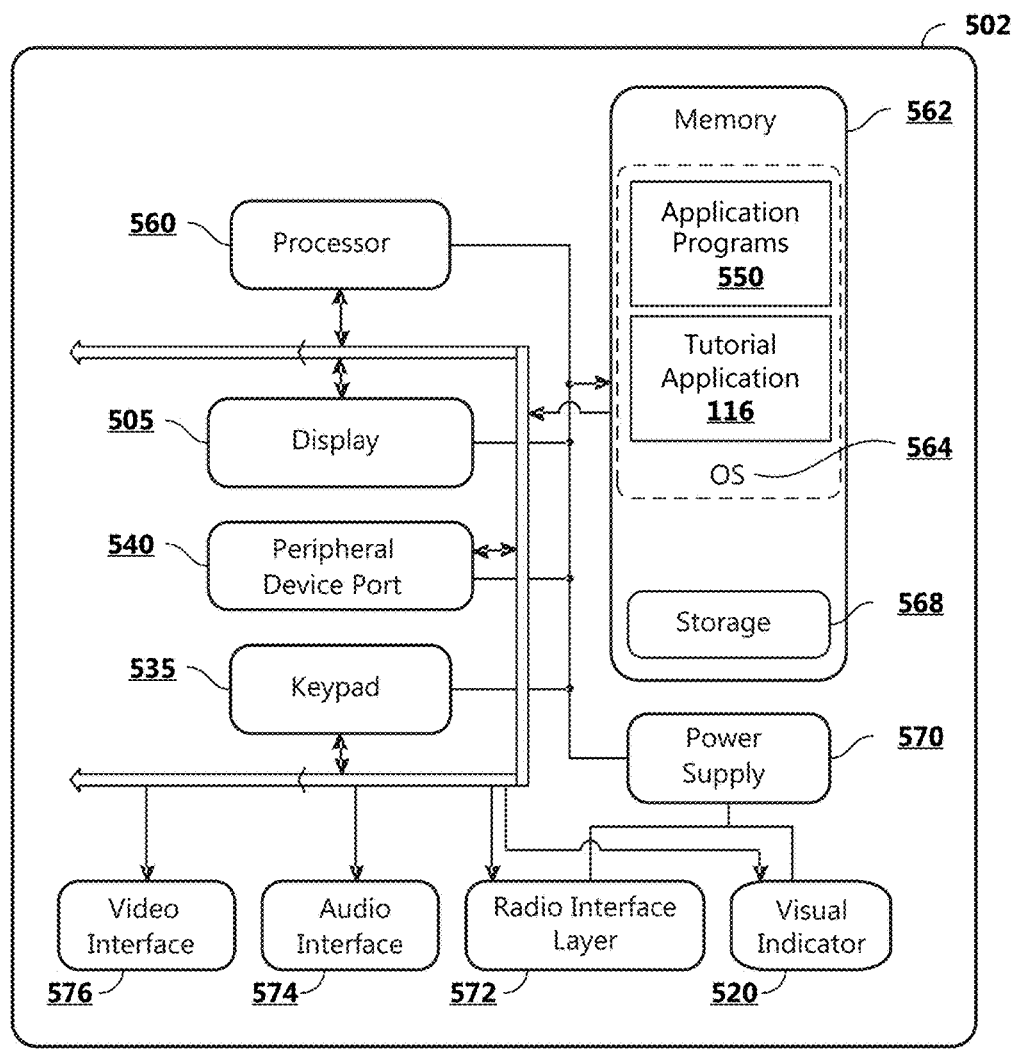
Figure 6:
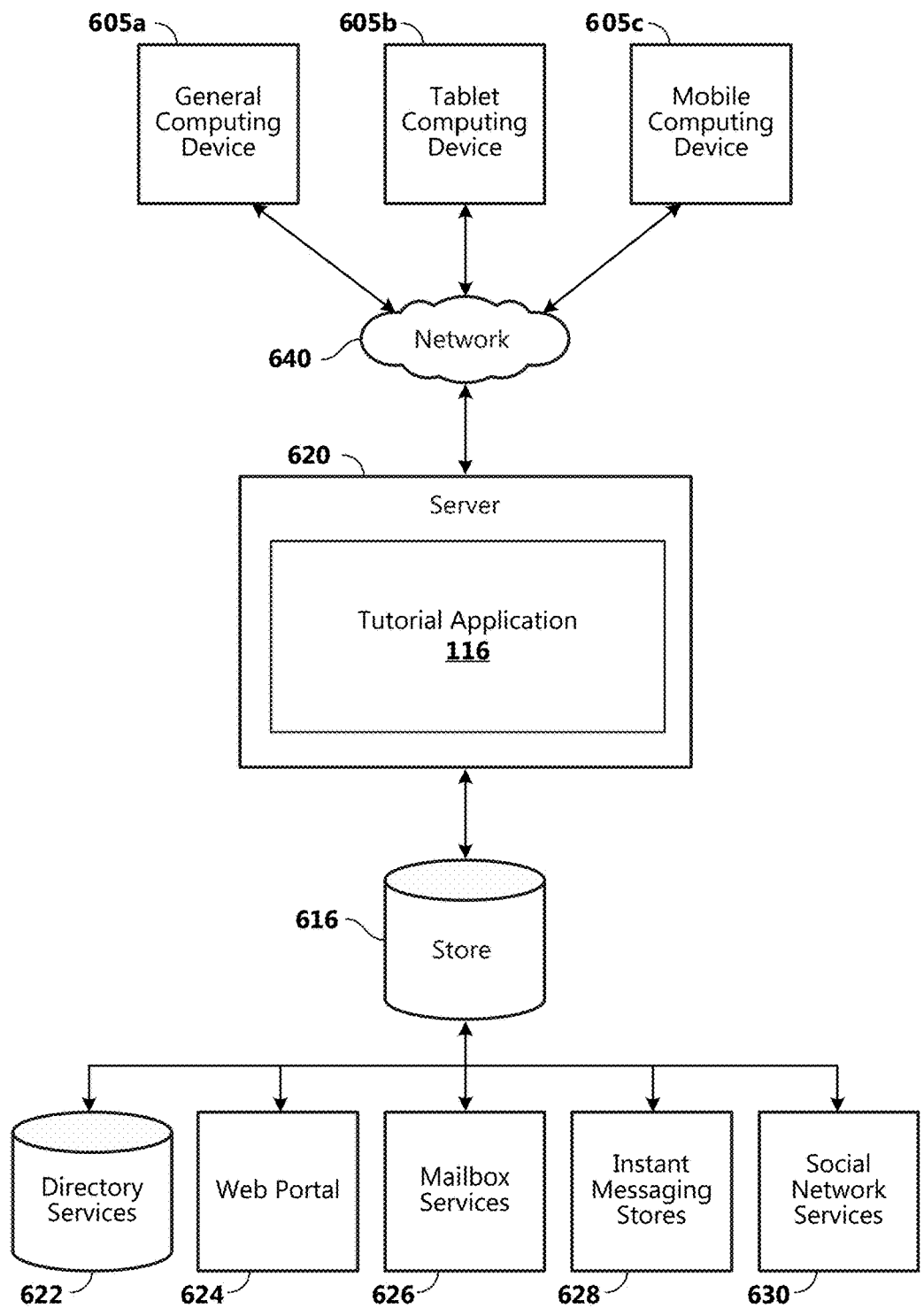
FIG. 6 is a simplified block diagram of a distributed computing system.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the tutorial application 116. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., tutorial application 116) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 4 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or less input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, the tutorial application 116 is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 is stored locally on the mobile computing device 500, as described above. According to another aspect, the data is stored on any number of storage media that is accessible by the device via the radio 572 or via a wired connection between the mobile computing device 500 and a separate computing device associated with the mobile computing device 500, for example, a server computer in a distributed computing network, such as the Internet. As should be appreciated such data/information is accessible via the mobile computing device 500 via the radio 572 or via a distributed computing network. Similarly, according to an aspect, such data/information is readily transferred between computing devices for storage and use according to well-known data/information transfer and storage means, including electronic mail and collaborative data/information sharing systems.

FIG. 6 illustrates one example of the architecture of a system for displaying steps of a solution to a problem as described above. Content developed, interacted with, or edited in association with the tutorial application 116 is enabled to be stored in different communication channels or other storage types. For example, various documents may be stored using a directory service 622, a web portal 624, a mailbox service 626, an instant messaging store 628, or a social networking site 630. The tutorial application 116 is operative to use any of these types of systems or the like for displaying steps of a solution to a problem, as described herein. According to an aspect, a server 620 provides the tutorial application 116 to clients 605a,b,c. As one example, the server 620 is a web server providing the tutorial application 116 over the web. The server 620 provides the tutorial application 116 over the web to clients 605 through a network 640. By way of example, the client computing device is implemented and embodied in a personal computer 605a, a tablet computing device 605b or a mobile computing device 605c (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for displaying steps of a solution to a problem in a user interface, comprising:
   dynamically generating a series of steps of a problem solution in response to receiving user input indicative of at least one problem to be solved;
   determining a first step of the series of steps to be displayed as part of the dynamically generated problem solution;
   displaying the first step of the series of steps of the problem solution in a step-by-step mode;
   in response to a next step selection, displaying a second step of the series of steps of the problem solution, wherein:
     the first and second steps are displayed separately; and
     the second step is designated as a focused step and is highlighted with respect to the first step;
   in response to a first user selection to switch modes:
     displaying the problem solution in an all-steps mode wherein each step of the problem solution is displayed separately, and wherein scrolling is enabled so that a user can scroll through the separate steps to view the separate steps; and
     designating one of the displayed steps as the focused step and highlighting the focused step with respect to any other displayed steps or portions thereof; and
   in response to a second user selection to switch modes, disabling scrolling of the steps and redisplaying the problem solution in the step-by-step mode.

2. The method of claim 1, wherein displaying the problem solution in the all-steps mode further comprises shifting the focused step up such that at least a portion of a next step of the problem solution is visible to indicate to the user that there is another step below the focused step.

3. The method of claim 1, wherein displaying the second step of the problem solution further comprises graying out the first step.

4. The method of claim 1, wherein designating the second step as the focused step further comprises displaying the focused step in a designated region of the user interface.

5. The method of claim 4, further comprising:
   subsequent to the first user selection to switch modes, receiving scrolling input within the all-steps mode; and
   responsive to receiving the scrolling input, navigating to a subsequent step according to the scrolling input, wherein the subsequent step takes the place of the focused step in the designated region of the user interface.

6. The method of claim 1, further comprising:
   displaying a next step control to allow the user to selectively move forward through the plurality of the solution steps one step at a time; and
   displaying a previous step control to allow the user to selectively move backward through the steps one step at a time.

7. The method of claim 6, wherein displaying the next step control and the previous step control comprises displaying the next step control and the previous step control within a designated region of the user interface to allow for repeated pressing of the controls.

8. The method of claim 1, wherein:

displaying the first step of the problem solution in the step-by-step mode comprises displaying the first step in a first card;

displaying the second step of the problem solution comprises displaying the second step in a second card; and in response to the first user selection to switch modes, displaying the problem solution in an all-steps mode comprises displaying each step of the problem solution in a separate card.

9. The method of claim 8, further comprising displaying a step number on each card and indicating a total number of steps of the problem solution to allow the user to determine a relative position within the total number of steps.

10. The method of claim 1, further comprising displaying a mode selector, wherein the first user selection to switch modes comprises one of:

receiving a selecting of the mode selector; or receiving scrolling input.

11. The method of claim 1, wherein receiving user input indicative of a problem to be solved comprises receiving user input defining a math problem.

12. The method of claim 1, wherein receiving user input indicative of a problem to be solved comprises receiving user input defining a physics problem.

13. The method of claim 1, wherein receiving user input indicative of a problem to be solved comprises receiving user input defining a chemistry problem.

14. The method of claim 1, wherein receiving user input indicative of a problem to be solved comprises receiving user input defining a recipe for preparing a food dish.

15. A system for displaying steps of a solution to a problem in a user interface, the system comprising a computing device, the computing device comprising:

at least one processing device; and at least one computer readable data storage device storing instructions that, when executed by the at least one processing device, provide a tutorial application, the tutorial application operative to:

dynamically generate a problem solution in response to receiving user input indicative of at least one problem to be solved;

determine a series of steps to be displayed as part of the dynamically generated problem solution;

display a problem solution in a step-by-step mode, wherein a first step of the series of steps is displayed in a first region of the user interface;

in response to a next step selection, display a second step of the series of steps in a second region of the user interface, wherein:

the first and second regions of the user interface are displayed separately and are sized to accommodate the respective first and second steps; and the second region is designated as a focused region and is highlighted with respect to the first region;

further display a mode selector;

in response to a first user selection of the mode selector:

display the series of steps in an all-steps mode wherein each step of the series of steps is displayed in a separate region, and wherein scrolling is enabled so that a user can scroll through the separate regions to view the series of steps; and designate one of the displayed regions as the focused region and highlight the focused region with respect to any other displayed regions or portions thereof; and in response to a second user selection of the mode selector, disable scrolling of the regions and redisplay the problem solution in the step-by-step mode.

16. The system of claim 15, wherein in displaying the problem solution in the all-steps mode, the tutorial application is further operative to shift the focused region up such that at least a portion of a next step of the series of steps is visible to indicate to the user that there is another step of the series of steps below the focused step.

17. The system of claim 15, wherein:

the focused region is displayed at a designated position on the user interface; and responsive to receiving scrolling input, the tutorial application is operative to navigate to a subsequent step of the series of steps according to the scrolling input, wherein the subsequent step of the series of steps takes the place of the focused region at the designated position of the user interface.

18. The system of claim 15, wherein:

the tutorial application is further operative to display a next step control to allow the user to selectively move forward through a plurality of the solution steps one at a time;

the tutorial application is further operative to display a previous step control to allow the user to selectively move backward through the steps one focused region at a time; and wherein in displaying the next step control and the previous step control, the tutorial application is operative to display the next step control and the previous step control within a designated region of the user interface to allow for repeated pressing of the controls without moving an input device.

19. The system of 15, wherein the tutorial application is further operative to display a step number on each focused region, the step number comprises an indication of a total number of steps of the series of steps to allow the user to determine a relative position within the total number of steps of the series of steps.

20. A computer readable storage device storing computer readable instructions, which when executed by a processing unit is operative to:

receive user input defining a problem to be solved;

dynamically determine a solution to the problem based on the received user input, wherein the solution comprises a plurality of individual steps used to solve the problem;

display a first step of the solution in a step-by-step mode, wherein the first step is displayed in a first numbered card;

further display a next step control to allow a user to selectively move forward through the steps one card at a time, wherein the next step control is displayed within a designated region of the user interface to allow for repeated pressing of the next step control;

in response to a user selection of the next step control, display a second step of the solution in a second numbered card, wherein:

the first and second numbered cards are displayed separately and are sized to accommodate the respective first and second steps of the solution; and the second numbered card is designated as a focused card and is highlighted with respect to the first numbered card, wherein the focused card is displayed at a designated region of the user interface;

further display a previous step control to allow the user to selectively move backward through the steps one card at a time, wherein the previous step control is displayed within a designated region of the user interface to allow for repeated pressing of the next step control;

further display a mode selector;

in response to a first user selection of the mode selector:
- display the solution in an all-steps mode wherein each step of the solution is displayed in a separate numbered card; and
- enable scrolling so that the user can scroll through the separate numbered cards to view the steps, wherein one of the numbered cards shown on the display is designated as the focused card and is highlighted with respect to any other displayed cards or portions thereof;

responsive to receiving scrolling input, navigate to a subsequent step according to the scrolling input, wherein the subsequent step takes the place of the focused card at the designated region of the user interface; and in response to a second user selection of the mode selector, disable scrolling.

* * * * *